United States Patent
Kim et al.

(10) Patent No.: US 12,106,573 B2
(45) Date of Patent: Oct. 1, 2024

(54) METHOD AND DEVICE FOR MONITORING PORT AND SHIP IN CONSIDERATION OF SEA LEVEL

(71) Applicant: Seadronix Corp., Ulsan (KR)

(72) Inventors: Han Keun Kim, Suwon-si (KR); Dong Hoon Kim, Daejeon (KR); Byeol Teo Park, Daejeon (KR); Jung Mo Goo, Seongnam-si (KR)

(73) Assignee: Seadronix Corp., Ulsan (KR)

( * ) Notice: Subject to any disclaimer, the term of this patent is extended or adjusted under 35 U.S.C. 154(b) by 146 days.

(21) Appl. No.: 17/860,692

(22) Filed: Jul. 8, 2022

(65) Prior Publication Data

US 2022/0351523 A1 Nov. 3, 2022

Related U.S. Application Data

(63) Continuation of application No. PCT/KR2021/000038, filed on Jan. 4, 2021.

(30) Foreign Application Priority Data

Jan. 9, 2020 (KR) .................. 10-2020-0003173
Oct. 26, 2020 (KR) .................. 10-2020-0139726

(51) Int. Cl.
*G06V 20/54* (2022.01)
*G06T 3/10* (2024.01)
(Continued)

(52) U.S. Cl.
CPC .............. *G06V 20/54* (2022.01); *G06T 3/10* (2024.01); *G06T 7/11* (2017.01); *G06T 7/60* (2013.01);
(Continued)

(58) Field of Classification Search
CPC ...... G06V 20/54; G06V 10/751; G06V 10/82; G06V 20/70; G06T 3/10; G06T 7/11; G06T 7/60; G06T 2207/20084; H04N 7/183
(Continued)

(56) References Cited

U.S. PATENT DOCUMENTS

2009/0271054 A1 10/2009 Dokken
2020/0074239 A1* 3/2020 Park .................. G06F 18/217
2021/0357655 A1 11/2021 Park et al.

FOREIGN PATENT DOCUMENTS

EP 3 862 997 8/2021
KR 10-1019555 B1 3/2011
(Continued)

OTHER PUBLICATIONS

English Translation of Korean Publication KR 2014-0126998 (Year: 2014).*
(Continued)

*Primary Examiner* — Loi H Tran
(74) *Attorney, Agent, or Firm* — WTA Patents

(57) ABSTRACT

The present invention relates to a method for monitoring a harbor performed by a computing device, the method for monitoring the harbor according to an aspect of the present invention comprising: obtaining a harbor image having a first view attribute; generating a segmentation image having the first view attribute and corresponding to the harbor image by performing an image segmentation using an artificial neural network trained to output information, from an input image, related to an object included in the input image; generating a transformed segmentation image having a second view attribute from the segmentation image having the first view attribute based on a first view transformation information used to transform an image having the first view attribute into an image having the second view attribute different from the first view attribute; and calculating berthing guide information of the ship based on the transformed segmentation image.

20 Claims, 47 Drawing Sheets

(51) Int. Cl.
  *G06T 7/11* (2017.01)
  *G06T 7/60* (2017.01)
  *G06V 10/75* (2022.01)
  *G06V 10/82* (2022.01)
  *G06V 20/70* (2022.01)
  *H04N 7/18* (2006.01)

(52) U.S. Cl.
  CPC ............ *G06V 10/751* (2022.01); *G06V 10/82* (2022.01); *G06V 20/70* (2022.01); *H04N 7/183* (2013.01); *G06T 2207/20084* (2013.01)

(58) Field of Classification Search
  USPC .......................................................... 348/103
  See application file for complete search history.

(56) References Cited

FOREIGN PATENT DOCUMENTS

| | | |
|---|---|---|
| KR | 10-1059623 B1 | 8/2011 |
| KR | 10-2014-0126998 A | 11/2014 |
| KR | 2016 0001271 A | 1/2016 |
| KR | 10-2016-0062286 A | 6/2016 |
| KR | 10-2017-0133010 A | 12/2017 |
| KR | 102005559 B1 | 8/2019 |
| KR | 10-2020-0060697 A | 6/2020 |
| WO | WO 2018/184058 | 10/2018 |
| WO | WO 2020/071839 | 4/2020 |

OTHER PUBLICATIONS

English Translation of Chinese Publication CN 106558038 (Year: 2019).*
PCT International Search Report and Written Opinion, PCT Application No. PCT/KR2021/000038, Apr. 26, 2021, 17 pages.
Notice of Allowance of Korean Patent Application No. 10-2020-0139726 corresponding to U.S. Appl. No. 17/860,692 issued on Feb. 17, 2023.
Office Action of Korean Patent Application No. 10-2020-0139726 corresponding to U.S. Appl. No. 17/860,692 issued on Aug. 18, 2022.
European Search Report of EP Patent Application No. 21738118.5 issued on Sep. 8, 2023.

* cited by examiner

FIG. 10

| identification value | class |
|---|---|
| 0 | sky and others |
| 1 | sea |
| 2 | topographic feature + short distance |
| 3 | topographic feature + middle distance |
| 4 | topographic feature + long distance |
| 5 | static obstacle + short distance |
| 6 | static obstacle + middle distance |
| 7 | static obstacle + long distance |
| 8 | moving obstacle + short distance |
| 9 | moving obstacle + middle distance |
| 10 | moving obstacle + long distance |

OBJ2　　　　　　OBJ2

OBJ2　　　　　　　　　　　　　　OBJ2 reference 1

FIG. 31
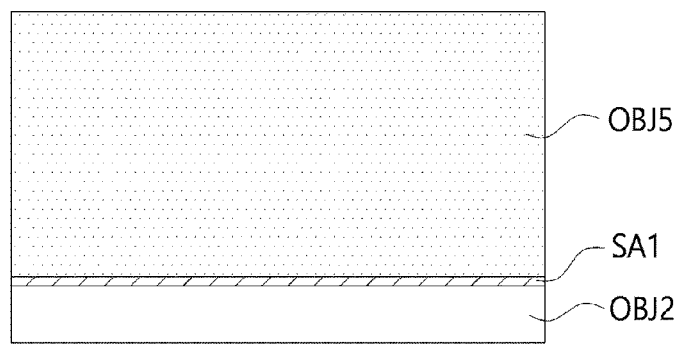
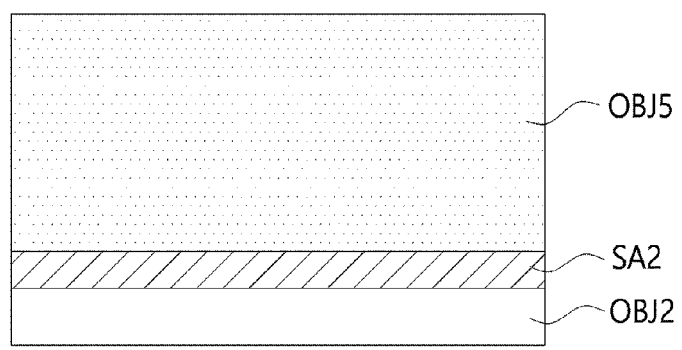

FIG. 34
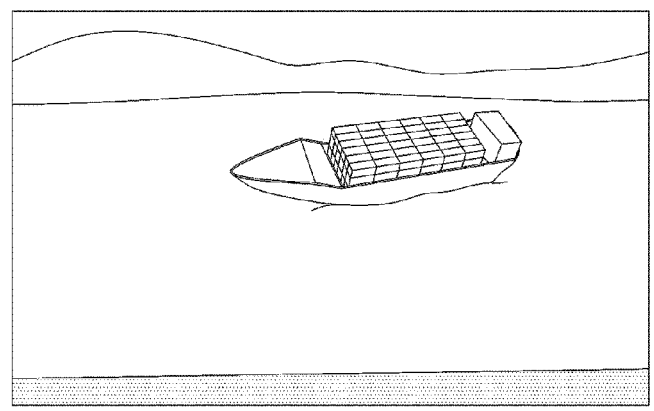
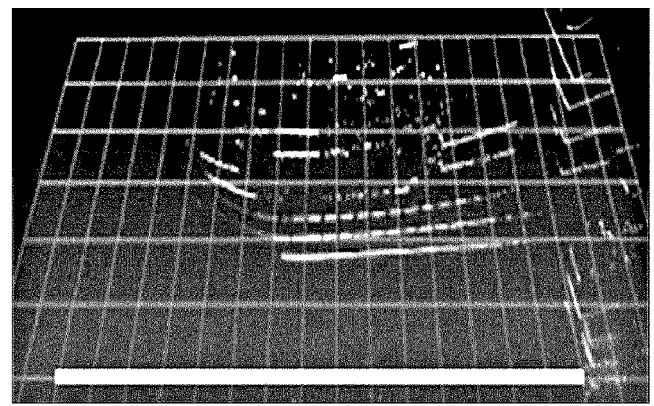

FIG. 36
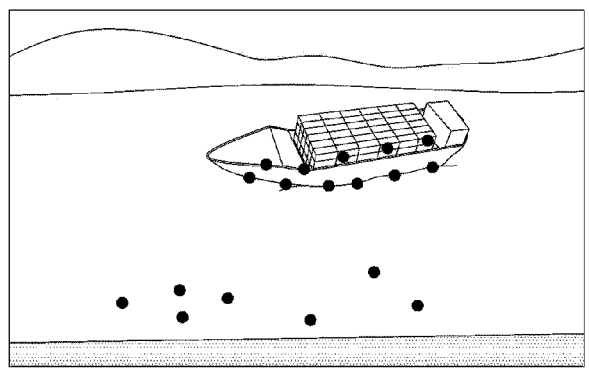
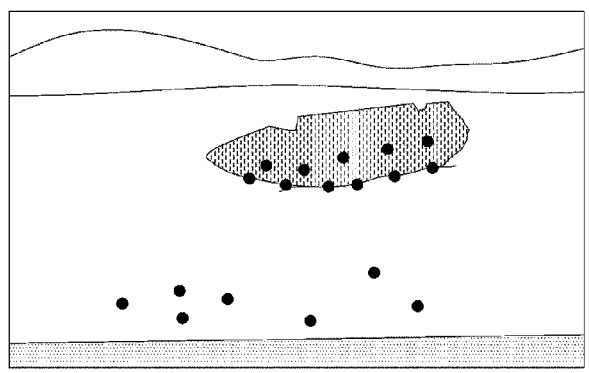

401

FIG. 44

METHOD AND DEVICE FOR MONITORING PORT AND SHIP IN CONSIDERATION OF SEA LEVEL

CROSS-REFERENCE TO RELATED APPLICATIONS

This application is a bypass continuation-in-part of International PCT Application No. PCT/KR2021/000038, filed on Jan. 4, 2021, which claims priority to Republic of Korea Patent Application No. 10-2020-0003173, filed on Jan. 9, 2020, and Republic of Korea Patent Application No. 10-2020-0139726, filed on Oct. 26, 2020, which are incorporated by reference herein in their entirety.

TECHNICAL FIELD

The present application relates to a method and device for monitoring a harbor and a vessel and, more particularly, to a method and device for monitoring a harbor and a vessel in consideration of sea level.

BACKGROUND ART

Many accidents have occurred in the sailing of vessels and in berthing or unberthing in harbors, and people's sailing carelessness is known as the main cause of the accidents. Here, the sailing carelessness is mainly caused by not being able to accurately monitor the surroundings of the vessel or the situation in the harbor with the naked eyes. Currently, various types of obstacle sensors are used to compensate for the sailing carelessness, but there are still limitations. For example, in the case of an Electronic Chart Display and Information System (ECDIS), there are limitations due to the inaccuracy of the Global Positioning System (GPS), the update period of the automatic identification system (AIS), and moving objects that are not registered in the AIS. In the case of a radar, there are limitations due to noise and the presence of unsearchable areas. As a result, it is still necessary to visually check for accurate detection of obstacles.

In addition, recently, a technology for monitoring situations around a vessel or in a harbor through images has been developed, but monitoring through inaccurate images, such as images that are distorted during image processing, may cause an accident as well. A sea level height in the sea may be an important consideration in image processing such as viewpoint transformation and matching of images, but there is a problem that a technology for calculating the sea level height is still insufficiently developed.

Accordingly, it is necessary to develop the technology that actually measures a sea level height and takes the sea level height into account for accurate monitoring.

SUMMARY

An objective of the present specification is to provide a method and device for monitoring the surroundings of a harbor and a vessel.

An objective of the present specification is to provide a monitoring device and method for monitoring the surroundings of a vessel and situations in a harbor during berthing or unberthing of the vessel, and guiding the berthing or the unberthing.

An objective of the present specification is to provide a harbor and vessel monitoring method and device for measuring a sea level height by using LIDAR data related to LIDAR beams reflected from the sea and a vessel.

An objective of the present specification is to provide a harbor and vessel monitoring method and device for measuring a sea level height by efficient data merging of a camera and a LIDAR The problem to be solved in this specification is not limited to the above-mentioned problems, and the problems not mentioned will be clearly understood by those skilled in the art to which the present invention belongs from the present specification and accompanying drawings.

According to an embodiment of the present specification, in a method for monitoring a harbor performed by a computing device, the method comprises: obtaining a harbor image having a first view attribute and including a ship object corresponding to a ship and a sea object corresponding to a sea; generating a segmentation image having the first view attribute and corresponding to the harbor image by performing an image segmentation using an artificial neural network trained to output information, from an input image, related to an object included in the input image, wherein the segmentation image includes a first pixel labeled to correspond to the ship object and a second pixel labeled to correspond to the sea object; generating a transformed segmentation image having a second view attribute from the segmentation image having the first view attribute on the basis of first view transformation information used to transform an image having the first view attribute into an image having the second view attribute different from the first view attribute; and calculating berthing guide information of the ship based on the transformed segmentation image, wherein the berthing guide information includes at least one of information related to a distance to a wharf wall of the ship or information related to an approaching velocity of the ship to the wharf wall, wherein generating the transformed segmentation image comprises: obtaining sea level information reflecting a sea level height; updating the first view transformation information by reflecting the sea level information; and generating the transformed segmentation image having the second view attribute from the segmentation image having the first view attribute on the basis of the updated first view transformation information.

According to an embodiment of the present specification, in a method for monitoring surroundings of a vessel performed by a computing device, the method comprises: obtaining a marine image having a first view attribute and including an obstacle object corresponding to an obstacle around a ship and a sea object corresponding to a sea; generating a segmentation image having the first view attribute and corresponding to the marine image by performing an image segmentation using an artificial neural network trained to output information, from an input image, related to an object included in the input image, wherein the segmentation image includes a first pixel labeled to correspond to the obstacle object and a second pixel labeled to correspond to the sea object; generating a transformed segmentation image having a second view attribute from the segmentation image having the first view attribute on the basis of first view transformation information used to transform an image having the first view attribute into an image having the second view attribute different from the first view attribute; and calculating navigation guide information of the ship based on the transformed segmentation image, wherein the navigation guide information includes at least one of information related to a distance to the obstacle of the ship or information related to an approaching velocity of the ship to the obstacle, wherein generating the transformed segmentation image comprises: obtaining sea level information reflecting a sea level height; updating the first view transformation information by reflecting the sea level information; and generating the transformed segmentation image having the second view attribute from the segmentation image having the first view attribute on the basis of the updated first view transformation information.

According to an embodiment of the present specification, in a harbor monitoring method performed by a computing device, the harbor monitoring method comprises: obtaining a first image having a first view and including a ship object corresponding to a ship and a sea object corresponding to a sea; generating a second image having a top view different from the first view by projecting the first image onto a first plane parallel to a sea level; generating berthing guide information on the basis of the second image, wherein the berthing guide information includes at least one of information on a distance of the ship to a wharf wall and information on an approach velocity of the ship to the wharf wall; obtaining sea level information corresponding to a height of a second plane that is formed at a height different from the first plane and is parallel to the first plane; and correcting the calculated berthing guide information by reflecting a height difference between the first plane and the second plane.

According to an embodiment of the present specification, in a harbor monitoring method performed by a computing device, the harbor monitoring method comprises: obtaining a first image having a first view and including a ship object corresponding to a ship and a sea object corresponding to a sea; obtaining sea level information reflecting a sea level height; updating viewpoint transformation information for projecting an image on a second plane parallel to a sea level and formed at a height different from the sea level on the basis of the sea level information in order to project the first image on a first plane formed parallel to the sea level at the sea level height; transforming the first image into a second image having a top view different from the first view by using the updated viewpoint transformation information; and calculating berthing guide information on the basis of the second image, wherein the berthing guide information includes at least one of information on a distance of the ship to a wharf wall and information on an approach velocity of the ship to the wharf wall.

According to an embodiment of the present specification, there may be provided a harbor monitoring method, comprising: obtaining an image captured by a camera; obtaining LIDAR data including a plurality of LIDAR points obtained by a LIDAR sensor having a field of view that at least partially overlaps a field of view of the camera; detecting a first area corresponding to a sea in the image and a second area corresponding to a ship in the image; selecting first LIDAR points related to LIDAR beams reflected from the sea in consideration of pixel positions of pixels included in the first area among the plurality of LIDAR points; calculating a first estimated sea level height by using the first LIDAR points; selecting second LIDAR points related to the LIDAR beams reflected from the ship among the plurality of LIDAR points in consideration of pixel positions of pixels included in the second area; determining, from the second LIDAR points, third LIDAR points related to LIDAR beams reflected from a lower area of the ship in contact with the sea on the basis of height values of the second LIDAR points; calculating a second estimated sea level height by using the third LIDAR points; and determining the sea level height in consideration of both the first estimated sea level height and the second estimated sea level height.

According to an embodiment of the present specification, there may be provided a harbor monitoring method, comprising: obtaining an image captured by a camera; obtaining LIDAR data including a plurality of LIDAR points obtained by a LIDAR sensor having a field of view that at least partially overlaps a field of view of the camera; detecting a first area corresponding to a sea in the image and a second area corresponding to a ship in the image; selecting first LIDAR points related to LIDAR beams reflected from the sea in consideration of pixel positions of pixels included in the first area from among the plurality of LIDAR points; determining first confidence of the first LIDAR points on the basis of characteristics of the LIDAR points; selecting second LIDAR points related to LIDAR beams reflected from the ship among the plurality of LIDAR points in consideration of pixel positions of pixels included in the second area; determining second confidence of the second LIDAR points on the basis of vessel information obtained from the image; and estimating sea level height by using at least one of the first LIDAR points and the second LIDAR points in consideration of the first confidence and the second confidence.

According to an embodiment of the present specification, there may be provided a harbor monitoring method, comprising: obtaining LIDAR data including a plurality of LIDAR points obtained by a LIDAR sensor; selecting first LIDAR points related to LIDAR beams reflected from a sea from among the plurality of LIDAR points; selecting second LIDAR points related to LIDAR beams reflected from a ship from among the plurality of LIDAR points; determining confidence of each of the first LIDAR points and the second LIDAR points for estimating a sea level height on the basis of at least one selected from the group of the number of the first LIDAR points and the second LIDAR points, deviation of height values, and distance values; and estimating the sea level height by using at least one of the first LIDAR points and the second LIDAR points in consideration of the confidence of each of the first LIDAR points and the second LIDAR points.

According to an embodiment of the present specification, there may be provided a harbor monitoring method, comprising: obtaining an image captured by a camera; obtaining LIDAR data including a plurality of LIDAR points obtained by a LIDAR sensor having a field of view that at least partially overlaps a field of view of the camera; detecting a vessel area corresponding to a ship in the image by using an artificial neural network, wherein the artificial neural network is trained by using a training set including a plurality of training images and object information labeled in pixels of the plurality of training images, each of at least some of the plurality of training images includes a ship and a sea, the object information reflects object type, and the pixels of the ship are labeled with the object information of the object type indicating the ship; selecting first LIDAR points related to LIDAR beams reflected from the ship from among the plurality of LIDAR points in consideration of pixel positions of pixels included in the vessel area; determining, from the first LIDAR points, second LIDAR points related to LIDAR beams reflected from a lower area of the ship in contact with the sea on the basis of height values of the first LIDAR points; and estimating a sea level height by using the second LIDAR points.

According to an embodiment of the present specification, there may be provided a harbor monitoring method, comprising: obtaining an image captured by a camera; obtaining LIDAR data including a plurality of LIDAR points obtained by a LIDAR sensor having a field of view that at least partially overlaps a field of view of the camera; detecting a vessel area corresponding to a ship in the image; selecting first LIDAR points related to LIDAR beams reflected from the ship from among the plurality of LIDAR points in consideration of pixel positions of pixels included in the vessel area; obtaining vessel information related to the ship from the image, wherein the vessel information includes at least one selected from the group of detection of the ship, a size of the vessel area, a distance to the vessel, and detection of occlusion related to the ship; and estimating a sea level height by using the first LIDAR points when preset condition is satisfied by the vessel information.

The problem solutions of the present specification are not limited to the above-described solutions, and solutions that are not mentioned may be understood clearly to those skilled in the art to which the present invention belongs from the present specification and the accompanying drawings.

According to the present specification, a harbor and the surroundings of a vessel may be monitored by using the monitoring device and method.

According to the present specification, the monitoring device and method may be used to monitor the surroundings of a vessel and situations of a harbor during berthing or unberthing of the vessel, and guide the berthing or unberthing.

According to the present specification, the sea level height may always be measured regardless of various situations by using LIDAR data related to LIDAR beams reflected from the sea and a vessel.

According to the present specification, the sea level height may be accurately measured by efficient data merging of a camera and a LIDAR The invention effects of the present specification are not limited to the above-described effects, and effects not mentioned herein may be clearly understood by those skilled in the art to which the present invention belongs from the present specification and accompanying drawings.

BRIEF DESCRIPTION OF DRAWINGS

FIG. 10 is a table related to labeling that simultaneously reflects information on types and distances of an object according to the embodiment.

FIGS. 30 to 43 are diagrams related to examples of obtaining of the sea level information according to the embodiment.

FIG. 44 is a diagram related to fog removal according to the embodiment.

DETAILED DESCRIPTION

Figure 1:
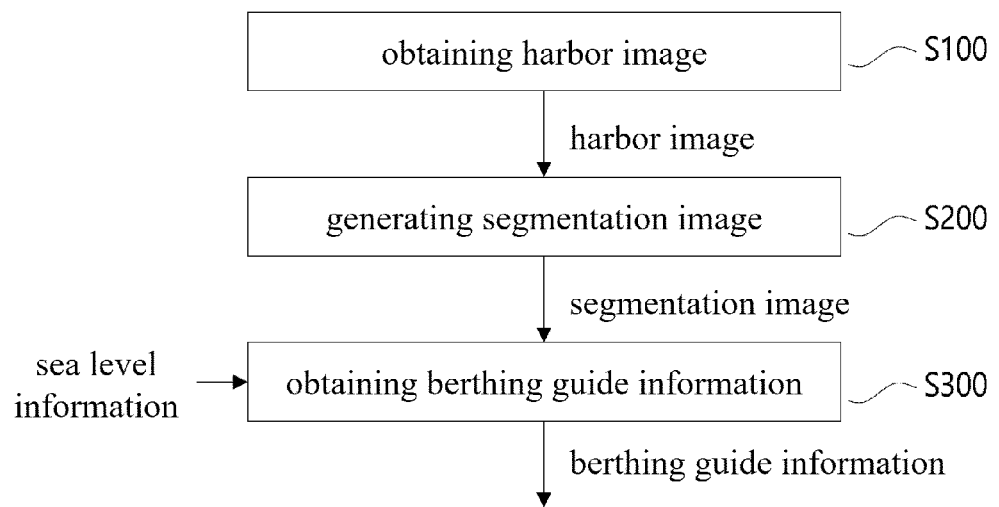
FIG. 1 is a diagram related to a harbor monitoring method in consideration of a sea level height according to an embodiment.

Embodiments described in this specification are intended to clearly explain the spirit of the invention to those skilled in the art. Therefore, the present invention is not limited by the embodiments, and the scope of the present invention should be interpreted as encompassing modifications and variations without departing from the spirit of the invention.

Terms used in this specification are selected from among general terms, which are currently widely used, in consideration of functions in the present invention and may have meanings varying depending on intentions of those skilled in the art, customs in the field of art, the emergence of new technologies, or the like. However, when a specific term is defined and used in a specific sense, the meaning of the term will be described separately. Accordingly, terms used in this specification should be interpreted based on the actual meanings and the whole context throughout the specification rather than based on the names.

The accompanying drawings are intended to easily explain the present invention, and shapes shown in the drawings may be exaggerated as necessary in order to aid in understanding the present invention. Therefore, the present invention is not limited by the drawings.

When it is determined that detailed descriptions of well-known elements or functions related to the present invention may obscure the subject matter of the present invention, detailed descriptions thereof will be omitted herein as necessary.

According to an embodiment of the present specification, in a method for monitoring a harbor performed by a computing device, the method comprises: obtaining a harbor image having a first view attribute and including a ship object corresponding to a ship and a sea object corresponding to a sea; generating a segmentation image having the first view attribute and corresponding to the harbor image by performing an image segmentation using an artificial neural network trained to output information, from an input image, related to an object included in the input image, wherein the segmentation image includes a first pixel labeled to correspond to the ship object and a second pixel labeled to correspond to the sea object; generating a transformed segmentation image having a second view attribute from the segmentation image having the first view attribute on the basis of first view transformation information used to transform an image having the first view attribute into an image having the second view attribute different from the first view attribute; and calculating berthing guide information of the ship based on the transformed segmentation image, wherein the berthing guide information includes at least one of information related to a distance to a wharf wall of the ship or information related to an approaching velocity of the ship to the wharf wall, wherein generating the transformed segmentation image comprises: obtaining sea level information reflecting a sea level height; updating the first view transformation information by reflecting the sea level information; and generating the transformed segmentation image having the second view attribute from the segmentation image having the first view attribute on the basis of the updated first view transformation information.

The updating step may include updating the first viewpoint transformation information generated on the basis of a reference plane by reflecting the sea level information.

The berthing guide information may be calculated on the basis of a border area that is an area where the vessel is in contact with the sea level.

Information on the distance of the vessel to the wharf wall may correspond to a distance of the border area to the wharf wall, and information on an approaching velocity to the wharf wall may correspond to an approaching velocity of the border area to the wharf wall.

The berthing guide information may be calculated on the basis of a first point included in the border area and corresponding to the bow of the vessel and a second point corresponding to the stem of the vessel.

Information on the distance of the vessel to the wharf wall may correspond to distances from the wharf wall to the respective first point and second point, and information on the approaching velocity to the wharf wall may correspond to approaching velocities from the wharf wall to the respective first point and second point.

The harbor image may include a first harbor image and a second harbor image in which the first harbor image and a monitoring area at least partially overlap.

The obtaining of the sea level information may include calculating the sea level information on the basis of an overlap area that is an area where a monitoring area of the first harbor image and a monitoring area of the second harbor image overlap.

The obtaining of the sea level information may further include determining the overlap area on the basis of feature points of the first harbor image and the second harbor image, which match each other.

The harbor image further includes a wharf wall object corresponding to the wharf wall, and the obtaining of the sea level information may include calculating the sea level information on the basis of a shaded area corresponding to the sea that is occluded by the wharf wall and is not expressed in the harbor image.

The obtaining of the sea level information may include calculating the sea level information on the basis of an area where a height measurement object included in the harbor image is exposed above the sea level.

The obtaining of the sea level information may include receiving the sea level information from a sensor for measuring the sea level information.

The obtaining of the sea level information may include receiving the sea level information from a vessel traffic service system (VTS system).

The berthing guide information may further include at least one of information on distances of a vessel to adjacent vessels and information on approaching velocities of the vessel to the adjacent vessels.

The harbor monitoring method may further include generating a display image having a third view attribute from the harbor image having the first view attribute on the basis of second viewpoint transformation information used to transform an image having the first view attribute into an image having the third view attribute different from the first view attribute and the second view attribute.

The harbor monitoring method may further include outputting the display image and the berthing guide information.

The outputting step may be a step of transmitting the display image and the berthing guide information to a terminal in order to display the display image and the berthing guide information by using the terminal located remotely, or a step of displaying the display image and the berthing guide information.

The artificial neural network may be trained in consideration of a difference between an output image output by inputting a training image to the artificial neural network and a labeling image in which information on types of objects included in the training image is reflected.

A second view may be characterized by a view of sea level as seen from above in a direction perpendicular to the sea level.

According to an embodiment of the present specification, in a method for monitoring a surrounding of a ship performed by a computing device, the method comprises: obtaining a marine image having a first view attribute and including an obstacle object corresponding to an obstacle around a ship and a sea object corresponding to a sea; generating a segmentation image having the first view attribute and corresponding to the marine image by performing an image segmentation using an artificial neural network trained to output information, from an input image, related to an object included in the input image, wherein the segmentation image includes a first pixel labeled to correspond to the obstacle object and a second pixel labeled to correspond to the sea object; generating a transformed segmentation image having a second view attribute from the segmentation image having the first view attribute on the basis of first view transformation information used to transform an image having the first view attribute into an image having the second view attribute different from the first view attribute; and calculating navigation guide information of the ship based on the transformed segmentation image, wherein the navigation guide information includes at least one of information related to a distance to the obstacle of the ship or information related to an approaching velocity of the ship to the obstacle, wherein generating the transformed segmentation image includes: obtaining sea level information reflecting a sea level height; updating the first view transformation information by reflecting the sea level information; and generating the transformed segmentation image having the second view attribute from the segmentation image having the first view attribute on the basis of the updated first view transformation information.

The sea level information may reflect a height of the camera, installed on a vessel, from the sea level.

The obtaining of the sea level information may include receiving sea level information from a sensor installed in the vessel to measure the sea level information.

According to an embodiment of the present specification, in a harbor monitoring method performed by a computing device, the harbor monitoring method comprises: obtaining a first image having a first view and including a ship object corresponding to a ship and a sea object corresponding to a sea; generating a second image having a top view different from the first view by projecting the first image onto a first plane parallel to a sea level; generating berthing guide information on the basis of the second image, wherein the berthing guide information includes at least one of information on a distance of the ship to a wharf wall and information on an approaching velocity of the ship to the wharf wall; obtaining sea level information corresponding to a height of a second plane that is formed at a height different from the first plane and is parallel to the first plane; and correcting the calculated berthing guide information by reflecting a height difference between the first plane and the second plane.

The height of the second plane may be the sea level height.

According to an embodiment of the present specification, in a harbor monitoring method performed by a computing device, the harbor monitoring method comprises: obtaining a first image having a first view and including a ship object corresponding to a ship and a sea object corresponding to a sea; obtaining sea level information reflecting the sea level height; updating viewpoint transformation information for projecting an image on a second plane parallel to a sea level and formed at a height different from the sea level on the basis of the sea level information in order to project the first image on a first plane formed parallel to the sea level at the sea level height; transforming the first image into a second image having a top view different from the first view by using the updated viewpoint transformation information; and calculating berthing guide information on the basis of the second image, wherein the berthing guide information includes at least one of information on a distance of the ship to a wharf wall and information on an approaching velocity of the ship to the wharf wall.

According to an embodiment of the present specification, there may be provided a harbor monitoring method, comprising: obtaining an image captured by a camera; obtaining LIDAR data including a plurality of LIDAR points obtained by a LIDAR sensor having a field of view that at least partially overlaps a field of view of the camera; detecting a first area corresponding to the sea in the image and a second area corresponding to a ship in the image; selecting first LIDAR points related to LIDAR beams reflected from the sea in consideration of pixel positions of pixels included in the first area among the plurality of LIDAR points; calculating a first estimated sea level height by using the first LIDAR points; selecting second LIDAR points related to the LIDAR beams reflected from the ship from among the plurality of LIDAR points in consideration of pixel positions of pixels included in the second area; determining, from the second LIDAR points, third LIDAR points related to LIDAR beams reflected from a lower area of the ship in contact with the sea on the basis of a height value of each second LIDAR point; calculating a second estimated sea level height by using the third LIDAR points; and determining the sea level height in consideration of both the first estimated sea level height and the second estimated sea level height.

The first estimated sea level height may be an average of height values of the first LIDAR points.

The determining of the third LIDAR points may include: generating LIDAR lines, including LIDAR points having substantially the same height, from the second LIDAR points; and selecting, as the third LIDAR points, LIDAR lines each having a lowest height value from among the LIDAR lines.

In a preset range, each LIDAR line may have the number of LIDAR points and/or a length.

The sea level height may be a weighted sum of the first estimated sea level height and the second estimated sea level height.

A first weight assigned to the first estimated sea level height may be determined on the basis of distance values of the first LIDAR points, and a second weight assigned to the second estimated sea level height may be determined on the basis of distance values of the second LIDAR points.

The harbor monitoring method further includes: calculating a first wave height from the first LIDAR points; and calculating a second wave height from the second LIDAR points, wherein the first weight to be assigned to the first estimated sea level height may be determined on the basis of a change in the first wave height per unit time, and the second weight to be assigned to the second estimated sea level height may be determined on the basis of a change in the second wave height per unit time.

The first area and the second area are detected by using an artificial neural network, and the artificial neural network may be trained by using a training set including a plurality of training images and object information labeled in pixels of the plurality of training images.

The first LIDAR points and/or the second LIDAR points are determined in consideration of characteristics of LIDAR points, and the characteristics of the LIDAR points may include at least one of the number of LIDAR points, deviation of height values, and distance values.

The second LIDAR points are determined on the basis of vessel information obtained from the image, and the vessel information may include at least one of detection of the second area, a size of the second area, a distance to a vessel, and detection of occlusion related to the vessel.

According to an embodiment of the present specification, there may be provided a harbor monitoring method, comprising: obtaining an image captured by a camera; obtaining LIDAR data including a plurality of LIDAR points obtained by a LIDAR sensor having a field of view that at least partially overlaps a field of view of the camera; detecting a first area corresponding to the sea in the image and a second area corresponding to a ship in the image; selecting first LIDAR points related to LIDAR beams reflected from the sea in consideration of pixel positions of pixels included in the first area from among the plurality of LIDAR points; determining first confidence of the first LIDAR points on the basis of characteristics of the LIDAR points; selecting second LIDAR points related to LIDAR beams reflected from the ship from among the plurality of LIDAR points in consideration of pixel positions of pixels included in the second area; determining second confidence of the second LIDAR points on the basis of the vessel information obtained from the image; and estimating the sea level height by using at least one of the first LIDAR points and the second LIDAR points in consideration of the first confidence and the second confidence.

The characteristics of the LIDAR points may include at least one of the number of LIDAR points, the deviation of height values, and the distance values.

The vessel information may include at least one of the detection of the second area, the size of the second area, the distance to the vessel, and the detection of occlusion related to the vessel.

According to an embodiment of the present specification, there may be provided a harbor monitoring method, comprising: obtaining LIDAR data including a plurality of LIDAR points obtained by a LIDAR sensor; selecting first LIDAR points related to LIDAR beams reflected from the sea from among the plurality of LIDAR points; selecting second LIDAR points related to LIDAR beams reflected from a ship from among the plurality of LIDAR points; determining confidence of each of the first LIDAR points and the second LIDAR points for estimating the sea level height on the basis of at least one of the number of the first LIDAR points and the number of the second LIDAR points, deviation of height values, and distance values; and estimating the sea level height by using at least one of the first LIDAR points and the second LIDAR points in consideration of the confidence of each of the first LIDAR points and the second LIDAR points.

According to an embodiment of the present specification, there may be provided a harbor monitoring method, comprising: obtaining an image captured by a camera; obtaining LIDAR data including a plurality of LIDAR points obtained by a LIDAR sensor having a field of view that at least partially overlaps a field of view of the camera; detecting a vessel area corresponding to a ship in the image by using an artificial neural network; selecting first LIDAR points related to LIDAR beams reflected from the ship from among the plurality of LIDAR points in consideration of pixel positions of pixels included in the vessel area, wherein the artificial neural network is trained by using a training set including a plurality of training images and object information labeled in pixels of the plurality of training images, each of at least some of the plurality of training images includes the ship and the sea, the object information reflects object types, and the pixels of the ship are labeled with the object information of the object types indicating the ship; determining, from the first LIDAR points, second LIDAR points related to LIDAR beams reflected from a lower area of the ship in contact with the sea on the basis of height values of the first LIDAR points; and estimating the sea level height by using the second LIDAR points.

The harbor monitoring method may further include verifying the sea level height on the basis of at least one of the number of the first LIDAR points, the deviation of height values, and the distance values.

According to an embodiment of the present specification, there may be provided a harbor monitoring method, comprising: obtaining an image captured by a camera; obtaining LIDAR data including a plurality of LIDAR points obtained by a LIDAR sensor having a field of view that at least partially overlaps a field of view of the camera; detecting a vessel area corresponding to a ship in the image; selecting first LIDAR points related to LIDAR beams reflected from the ship from among the plurality of LIDAR points in consideration of pixel positions of pixels included in the vessel area; obtaining vessel information related to the ship from the image; and estimating the sea level height by using the first LIDAR points when preset conditions are satisfied by the vessel information, and the vessel information includes at least one of detection of the ship, a size of the vessel area, a distance to the vessel, and detection of occlusion related to the ship.

The harbor monitoring method may further include: detecting a sea area corresponding to the sea in the image; selecting the second LIDAR points related to the LIDAR beams reflected from the sea in consideration of the pixel positions of pixels included in the sea area from among the plurality of LIDAR points; and estimating the sea level height by using the second LIDAR points when the preset conditions are not satisfied by the vessel information.

According to an embodiment of the present specification, a computer-readable recording medium in which a program for performing the above-described methods is recorded may be provided.

Hereinafter, the harbor and vessel monitoring method and device thereof in consideration of the sea level will be described.

In the present specification, the sea level height should be broadly interpreted to include not only an absolute sea level height, but also a relative sea level height, that is, the relative sea level height compared with an average sea level height of a specific sea area. For example, the sea level height may include a variety of information that may vary with changes in the sea level height, the information including a distance between a sea level and a wharf wall, a distance between the sea level and a monitoring device (e.g., an image generation unit), a length of an object exposed above the sea level, and the like.

In the present specification, monitoring refers to identifying or recognizing surrounding situations, and should be broadly interpreted to include not only detecting a detection target such as a predetermined area or a specific object by using various sensors to provide a detection result to a user, but also providing additional information through calculation or the like on the basis of the detection result.

In the present specification, image-based monitoring may mean identifying or recognizing the surrounding situations on the basis of images. For example, the monitoring may mean obtaining images around a vessel during an operation of a vessel, so as to recognize other vessels or obstacles from the obtained images, or obtaining information for calculating berthing guide information when berthing or unberthing of the vessel.

In the present specification, berthing guide information may refer to information usable in berthing a vessel and in assisting or guiding a user, such as a pilot or a captain, to operate the berthing. For example, the berthing guide information may refer to information about an environment, such as recognition of a vessel, an obstacle, or the like, identification of harbor situations, whether a berth is accessible, a distance to a wharf wall, an approaching velocity to the wharf wall, a distance between the vessel and another vessel, relative speed between the vessel and another vessel, and identification of whether there is the obstacle on a navigation path. In the present specification, the monitoring is described for a case where berthing is performed mainly in vessels and harbors, but is not limited thereto, and may be applied to a case of driving of a vehicle, an operation of an aircraft, and the like.

In the present specification, the harbor and vessel monitoring device is a device for performing harbor and vessel monitoring, and a detailed configuration thereof will be described later.

FIG. 1 is a diagram related to the harbor monitoring method in consideration of the sea level according to the embodiment. Referring to FIG. 1, the harbor monitoring method may include step S100 of obtaining a harbor image, step S200 of generating a segmentation image, and step S300 of obtaining berthing guide information.

Step S100 of obtaining the harbor image may refer to a step in which the monitoring device obtains the harbor image. Step S200 of generating the segmentation image may refer to a step in which the monitoring device performs image segmentation to generate the segmentation image from the harbor image. Specific details of the image segmentation will be described later. Step S300 of obtaining the berthing guide information may refer to a step in which the monitoring device obtains the berthing guide information on the basis of the segmentation image. Here, the monitoring device may obtain the berthing guide information in consideration of the sea level, including such a sea level height. When the sea level is considered, the accuracy of the berthing guide information may be improved. Specific details on the step of obtaining the berthing guide information will be described later.

Figure 2:
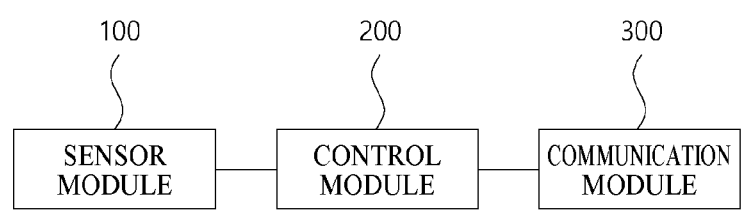
FIG. 2 is a diagram related to a monitoring device according to the embodiment.

FIG. 2 is a diagram related to a monitoring device according to an embodiment. Referring to FIG. 2, a monitoring device 10 may include a sensor module 100, a control module 200, and a communication module 300.

The sensor module 100 may obtain or sense information on a vessel or a vessel's surroundings and a harbor. The sensor module 100 may include an automatic identification system (AIS), an image generation unit, a LIDAR sensor, a location measurement unit, an orientation measurement unit, a casing/case, and the like.

The image generation unit may generate an image. The image generation unit may include a camera, a radar, an ultrasonic detector, and the like. Examples of the camera include a monocular camera, a binocular camera, a visible light camera, an IR camera, and a depth camera, but not limited thereto.

The LIDAR sensor is a sensor for detecting distances and positions of an object by using a laser. For example, a distance between the LIDAR sensor and the object and a position of the object relative to the LIDAR sensor may be expressed by a three-dimensional coordinate system. For example, the distance between the LIDAR sensor and the object and the position of the object relative to the LIDAR sensor may be expressed in a Cartesian coordinate system, a spherical coordinate system, a cylindrical coordinate system, or the like. The LIDAR sensor may have a plurality of channels in a vertical or horizontal direction, and for example, a LIDAR sensor may have 32 or 64 channels.

The LIDAR sensor may use laser beams reflected from an object to determine a distance R from the object. For example, the LIDAR sensor may use a time of flight (TOF), which is a time difference between an emitted laser beams and a detected laser beam, in order to determine the distance to the object. To this end, the LIDAR sensor may include a laser outputting unit for outputting the laser beams and a receiving unit for detecting the reflected laser beams. The LIDAR sensor determines a time the laser beams are output from the laser outputting unit, checks a time when the receiving unit detects the laser beams reflected from an object, and determines a distance to the object on the basis of a difference between a time of emission and a time of detection. Naturally, in order to determine the distance R from the object, the LIDAR sensor may use other methods such as triangulation based on detected positions of detected laser beams, and a method of using phase shifts of the detected laser beams.

The LIDAR sensor may determine positions of an object by using angles of the emitted laser beams. For example, in a case where an emitting angle of one laser beam emitted from a LIDAR sensor toward a scan area of the LIDAR sensor can be known, the LIDAR sensor may determine a location of the object by using the emitting angle of the emitted laser beam when the laser beam reflected from an object existing on the scan area is detected by the receiving unit.

The LIDAR sensor may have a scan area including an object in order to detect positions of arbitrary objects in the vicinity. Here, the scan area represents a detectable area as one screen, and may mean a set of points, lines, and planes, which form one screen during one frame. In addition, the scan area may mean an illuminated area of laser beams emitted from the LIDAR sensor, and the illuminated area may mean a set of points, lines, and surfaces where the laser beams emitted during one frame meets a spherical surface at the same distance R In addition, the field of view (FOV) means a detectable area, and may be defined as an angular range of the scan area when the LIDAR sensor is viewed as an origin.

The location measurement unit may measure the location of the sensor module 100 or the location of an element, such as the image generation unit, included in the sensor module 100. As an example, the location measurement unit may be a Global Positioning System (GPS) unit. In particular, a real-time kinematic GPS may be used to improve the accuracy of location measurement.

The location measurement unit may acquire location information at predetermined time intervals. Here, the time interval may vary depending on the installation location of the sensor module 100. For example, when the sensor module 100 is installed in a moving object such as a vessel, the location measurement unit may acquire location information at short time intervals. On the other hand, when the sensor module 100 is installed in a fixture such as a harbor, the location measurement unit may acquire location information at long time intervals. The time interval at which the location measurement unit acquires the location information may be changed.

The orientation measurement unit may measure the orientation of the sensor module 100 or the orientation of an element, such as the image generation unit, included in the sensor module 100. As an example, the orientation measurement unit may be an inertial measurement unit (IMU).

The orientation measurement unit may acquire orientation information at predetermined time intervals. Here, the time interval may vary depending on the installation location of the sensor module 100. For example, when the sensor module 100 is installed in a moving object such as a vessel, the orientation measurement unit may acquire orientation information at short time intervals. On the other hand, when the sensor module 100 is installed in a fixture such as a harbor, the orientation measurement unit may acquire orientation information at long time intervals. The time interval at which the orientation measurement unit acquires the orientation information may be changed.

The casing may protect sensor modules 100 such as an image generation unit, a location measurement unit, and an orientation measurement unit.

At least one selected from the group of the image generation unit, the location measurement unit, and the orientation measurement unit may be present inside the casing. The casing can prevent an apparatus, such as an image generation unit therein, from being corroded by salt water. Alternatively, the casing may protect the apparatus therein by preventing or mitigating an impact applied to the apparatus.

A cavity may be formed inside the casing to encompass an image generation unit or the like. For example, the casing may have a rectangular parallelepiped shape with an empty interior, but not limited thereto. The casing may be provided in various shapes in which an image generation unit or the like may be positioned.

When the image generation unit is positioned inside the casing, an opening may be formed in one area of the casing or one area of the casing may be formed of a transparent material such as glass to secure the sight of the image generation unit. The image generation unit may capture images of a vessel's surroundings and a harbor through the opening or the transparent area.

The casing may be made of a robust material to protect the image generation unit or the like from external impact.

Alternatively, the casing may be formed of a material such as a seawater-resistant alloy to prevent corrosion due to salt.

The casing may include an apparatus for removing foreign substances from the image generation unit. As an example, foreign substances adhering to the surface of the image generation unit may be physically removed through a wiper included in the casing. Here, the wiper may be provided in a linear shape or a plate shape having the same, or a similar, curvature as a surface from which foreign substances are to be removed so as to be in close contact with the surface. As another example, foreign substances may be removed by applying water or washer fluid through a liquid spray included in the casing or may be physically removed using the wiper after the application.

The foreign-substance removal apparatus may be manually activated but can also be automatically activated. For example, the foreign-substance removal apparatus may be operated at predetermined time intervals. Alternatively, the foreign-substance removal apparatus may be operated using a sensor that detects whether a foreign substance has adhered to the image generation unit. Alternatively, after determining whether a foreign substance has been captured in an image captured by the image generation unit, the foreign-substance removal apparatus may be operated when it is determined that the foreign substance is in the image. Here, whether the foreign substance has been captured in the image may be determined through an artificial neural network.

One sensor module 100 may include a plurality of identical apparatuses including two or more identical cameras. The control module 200 may perform image analysis. The control module 200 may perform image segmentation or determine berthing guide information. Also, an operation of receiving various kinds of data through the sensor module 100, an operation of outputting various outputs through an output module, an operation of storing various kinds of data in a memory or acquiring various kinds of data from a memory, and the like may be performed by control of the control module 200.

Examples of the control module 200 may include a central processing unit (CPU), a graphics processing unit (GPU), a digital signal processor (DSP), a state machine, an application-specific integrated circuit (ASIC), a radio-frequency integrated circuit (RFIC), and a combination thereof.

The communication module 300 may transmit information externally from the device 10 or receive information from an external. The communication module 300 may perform wired or wireless communication. The communication module 300 may perform bidirectional or unidirectional communication. For example, the device 10 may deliver information to an external output device through the communication module 300 to output a control result of the control module 200 through the external output device. Also, the communication module 300 may receive VTS information or CITS(Costal Intelligent Transport System) information related to the vessel from the Vessel Traffic Service (VTS) that controls vessels.

The sensor module 100, the control module 200, and the communication module 300 may each include a control unit. The control unit may perform processing and computation on various kinds of information in a corresponding module and may control other elements included in the module. The control unit may be provided in the form of an electronic circuit that physically processes electric signals. The module may physically include only a single control unit but may alternatively include a plurality of control units. As an example, the control unit may be one or a plurality of processors installed in one computing means. As another example, the control unit may be provided as processors installed in physically separated servers and terminals to collaborate through communication. Examples of the control unit may include a CPU, a GPU, a DSP, a state machine, an ASIC, an RFIC, and a combination thereof. Hereinafter, various operations or steps disclosed in embodiments of the present specification may be interpreted as being performed by the control module 200 or the control unit, or being performed by the control of the control module 200 or the control unit, unless otherwise stated.

The sensor module 100, the control module 200, and the communication module 300 may each include a communication unit. The modules may transmit and receive information through the communication units. For example, the sensor module 100 may transmit information acquired externally through the communication unit, and the control module 200 may receive information transmitted by the sensor module 100 through the communication unit. The communication unit may perform wired or wireless communication. The communication unit may perform bidirectional or unidirectional communication.

The sensor module 100, the control module 200, and the communication module 300 may each include a memory. The memory may store various processing programs, parameters for processing programs, data obtained through such processing, and the like. For example, the memory may store data necessary for learning and/or inference, an artificial neural network being trained or already trained, and the like. The memory may be implemented as a non-volatile semiconductor memory, a hard disk, a flash memory, a random-access memory (RAM), a read-only memory (ROM), an electrically erasable programmable read-only memory (EEPROM), or other tangible non-volatile recording media.

The monitoring device 10 may include a plurality of identical modules such as including two or more sensor modules 100. For example, one device 10 may include two sensor modules 100, and each sensor module 100 may include two cameras.

Figure 3:
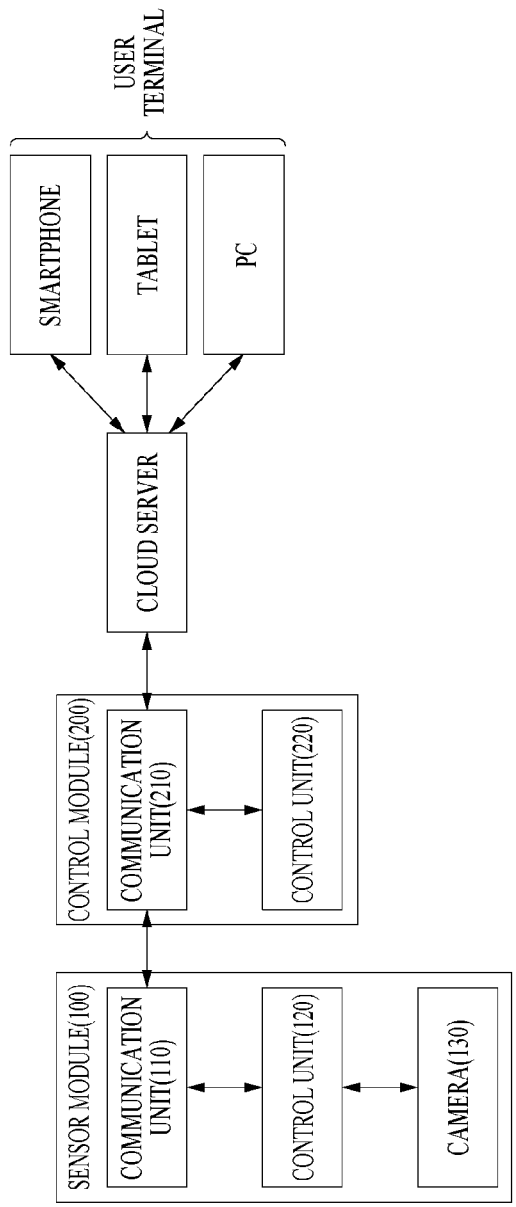
FIGS. 3 and 4 are diagrams related to an example of the monitoring device according to the embodiment.
Figure 4:
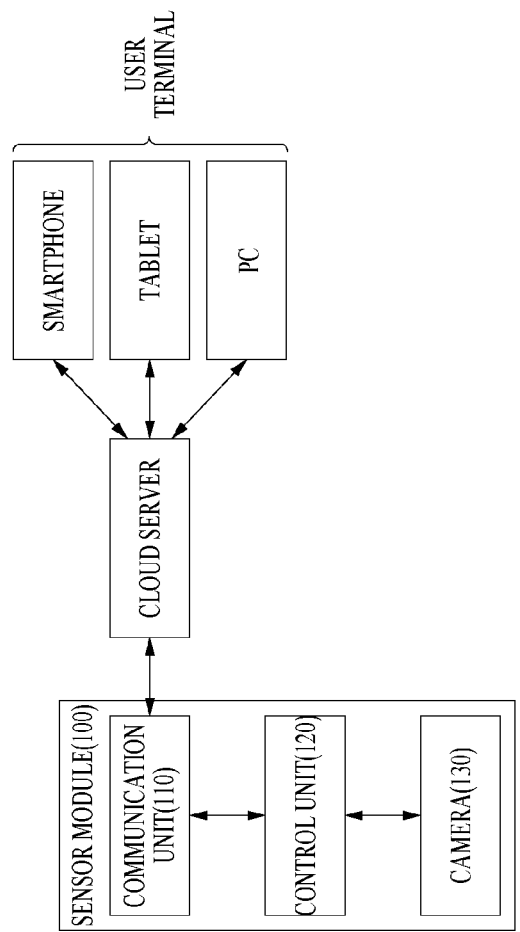

FIGS. 3 and 4 are diagrams related to an example of a monitoring device according to an embodiment.

Referring to FIG. 3, the monitoring device may include a sensor module 100 and a control module 200. The sensor module 100 may generate an image through a camera 130 and transmit an image to the control module 200 through a communication unit 110. Also, a control unit 120 of the sensor module 100 may change a viewpoint of an image by performing viewpoint transformation, which will be described below. The control module 200 may receive an image from the sensor module 100 through the communication unit 210 and may perform image analysis such as berthing guide information determination, location/movement information estimation and image matching, which will be described below, through a control unit 220. Also, the control module 200 may transmit an analysis result such as a matched image, location/movement information and berthing guide information to a cloud server through the communication unit 210. The cloud server may transmit the analysis result received from the control module 200 to a user terminal, such as a smartphone, a tablet, and a personal computer (PC), or may receive an instruction from a user terminal.

Referring to FIG. 4, the monitoring device may include a sensor module 100. The sensor module 100 may generate an image through a camera 130 and transmit an image to a cloud server through a communication unit 110. Also, a control unit 120 of the sensor module 100 may change the viewpoint of an image by performing viewpoint transformation, which will be described below. The cloud server may receive an image from the sensor module 100 and perform image analysis such as berthing guide information determination, location/movement information estimation and image matching, which will be described below. Also, the cloud server may transmit a result of the image analysis to a user terminal, such as a smartphone, a tablet, and a PC, or may receive an instruction from a user terminal.

The devices shown in FIGS. 2 to 4 are for illustrative purposes only, and the configuration of the device is not limited thereto.

As an example, the device may include an output module. The output module may output a result of computation performed by the control module, or the like. For example, the output module may output an analysis result. The output module may be, for example, a display, a speaker, a signal output circuit, or the like, but not limited thereto. In this case, information may be output through the output module rather than being delivered to an external output device, such as a user terminal, so that the external output device outputs the information.

As another example, the device may include no sensor modules. In this case, the control module may perform an image-based monitoring operation, for example, by receiving information from an external sensor device and performing image analysis. For example, the control module may receive information from an AIS, a camera, a lidar, a radar, or the like installed in a vessel or a harbor and perform image analysis.

Also, the step performed by each element shown in FIGS. 2 to 4 is not necessarily performed by the corresponding element and may be performed by other elements. For example, in FIG. 3 above, it has been described that the control unit 120 of the sensor module 100 performs viewpoint transformation, but the control unit 220 of the control module 200 or the cloud server may perform viewpoint transformation.

Image acquisition for image-based monitoring may be performed through a sensor module 100. For example, an image may be acquired through an image generation unit included in the sensor module 100. Alternatively, as described above, an image may be acquired from an external sensor device. Generally, images for vessel and harbor monitoring may include the sea, vessels, buoys, obstacles, topographic features, harbors, the sky, buildings, and the like. The following description mainly relates to perform monitoring by analyzing an image acquired through a visible light camera, but not limited thereto.

Figure 5:
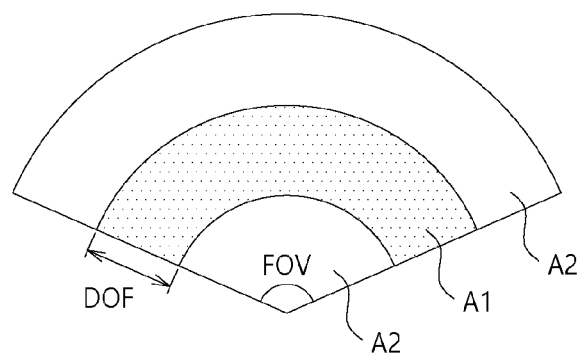
FIG. 5 is a diagram related to a field of view and a depth of field according to the embodiment.

A field of view (FOV) and a depth of field (DOF) may vary depending on the image generation unit. FIG. 5 is a diagram related to a field of view and a depth of field according to an embodiment. Referring to FIG. 5, a field of view may refer to a range covered by the image up, down, to the right and left and is generally expressed as an angle (degree). A larger FOV may mean generating an image including an area with a larger transverse width or generating an image including an area with a larger longitudinal width. A depth of field (DOF) may refer to a distance range recognized as being in focus, and a deep DOF may mean that the distance range recognized as being in focus is large. Referring to FIG. 5, depending on the DOF, the image may include an area A1 recognized as being in focus and the other area A2. Hereinafter, an area included in an image is referred to as an imaging area A1+A2, and the area recognized as being in focus is referred to as an effective area A1.

Since monitoring such as image analysis and berthing guide information calculation may be performed based on the effective area or based on a portion or the entirety of the imaging area, an area used to perform image analysis and monitoring is referred to as a monitoring area.

Examples of a camera with a large FOV and a shallow DOF include a wide-angle camera. Examples of a camera with a small FOV and a deep DOF include a high-magnification camera and a zoom camera.

The sensor module may be installed in a lighting tower, crane, vessel, etc. in a harbor without any limitation on its location or orientation, and there is no limitation on the number of sensor modules. However, the installation locations or numbers of sensor modules may vary depending on the characteristics such as the types and performances of the sensor modules. For example, when the sensor module is a camera, the sensor module may be installed at an altitude of 15 m or higher from the sea level to perform efficient monitoring, or a plurality of cameras may be installed to have different imaging areas. Also, the location and orientation of the sensor module may be adjusted manually or automatically upon or after installation.

The field of view of the LIDAR may at least partially overlap the field of view of the image generation unit (e.g., a camera). For example, the field of view (FOV) of the LIDAR may be smaller than the field of view of the camera. As will be described later, in this case, LIDAR data outside the field of view of the LIDAR for which the LIDAR data is not obtained may be estimated by using images obtained from the camera.

Figure 6:
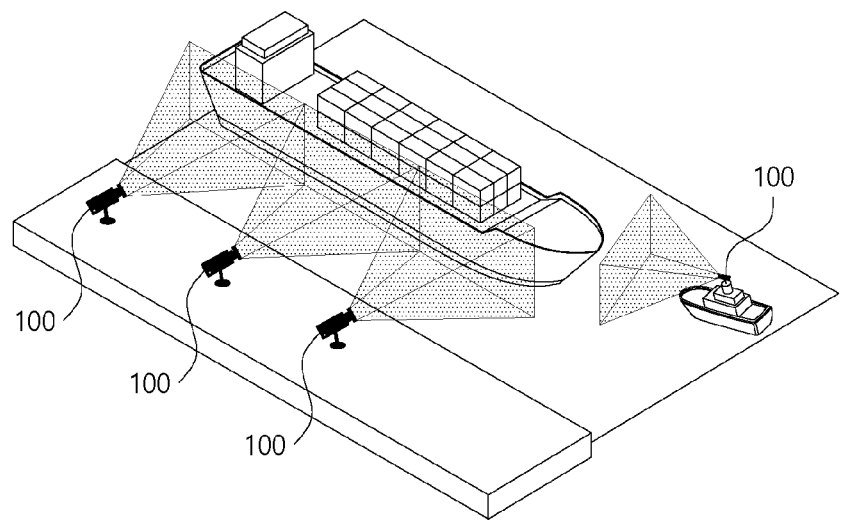
FIGS. 6 and 7 are diagrams related to an installation position of a sensor module according to the embodiment.
Figure 7:
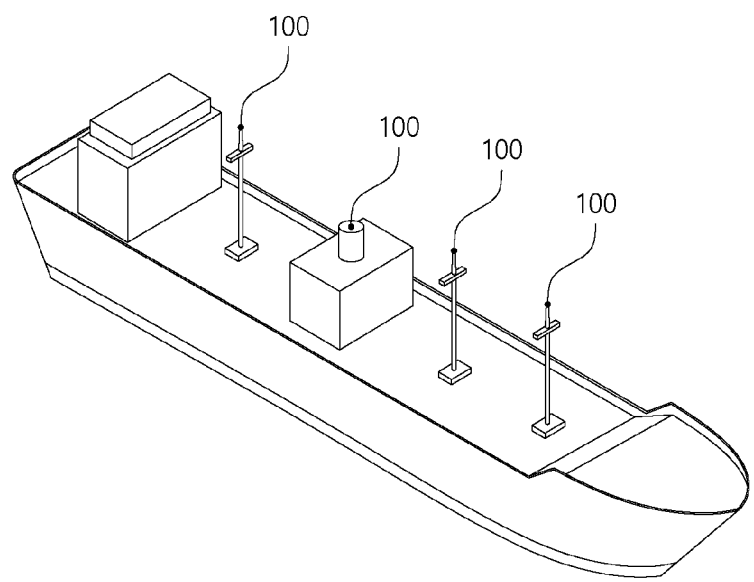

FIGS. 6 and 7 are diagrams related to the installation location of a sensor module according to an embodiment. Referring to FIGS. 6 and 7, a sensor module 100 may be installed at a fixed place such as a harbor or on land or may be installed on a moving object such as a vessel. Here, when the sensor module 100 is installed on a vessel, the sensor module 100 may be installed on a vessel to be monitored (hereinafter referred to as a "target vessel") as shown in FIG. 7 or may be installed on a third-party vessel that is not to be monitored such as a tugboat that supports the berthing or unberthing of a target vessel as shown in FIG. 6. In addition, the sensor module may be installed on a drone or the like to monitor a target vessel.

The other elements of the monitoring device may be installed together with or separately from the sensor module.

As described above, the image analysis for image-based monitoring may include acquiring an object characteristic. Examples of an object may include vessels, harbors, buoys, the sea, topographic features, the sky, buildings, people, animals, fire, smoke, and the like. Examples of an object characteristic may include the type of the object, the location of the object, a distance to the object, and the absolute and relative speeds and velocities of the object, and the like.

The image analysis for image-based monitoring may include recognizing/determining a surrounding situation. For example, the image analysis may be for determining that a fire situation has occurred from an image of a fire in a harbor or that an intruder has come in from an image of a person entering a harbor at an unscheduled time. For another example, the image analysis may include detecting a fire from an image in which smoke is present.

The image analysis for image-based monitoring may be performed through the control module or the control unit included in each module.

Hereinafter, each step and configuration of harbor and vessel monitoring will be described in more detail.

As described above, the monitoring method may include obtaining a harbor image, and the obtaining of the harbor image may mean a step in which the monitoring device obtains the harbor image. The harbor image may be generated by an image generation unit included in the monitoring device. Alternatively, the monitoring device may receive a harbor image from outside. Here, the types of images may be various, such as an RGB image, an IR image, a depth image, a LIDAR image, and a radar image, and there is no limitation. In addition, a three-dimensional image as well as a two-dimensional image may be usable.

The device may recognize an object. For example, the device may recognize the object included in an image. For example, the device may determine whether the object such as a vessel, a tugboat, the sea, or a harbor is included in the image. Here, object recognition may be determining at which position in the image the object exists.

Figure 8:
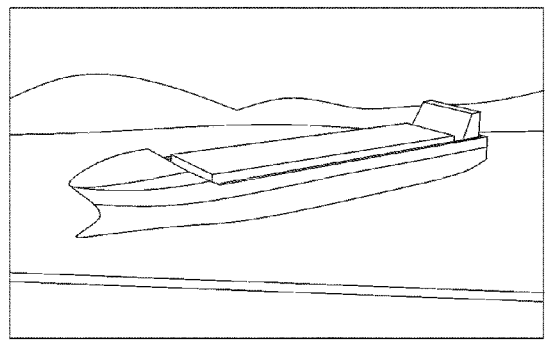
FIGS. 8 and 9 are diagrams related to an example of object recognition according to the embodiment.
Figure 9:
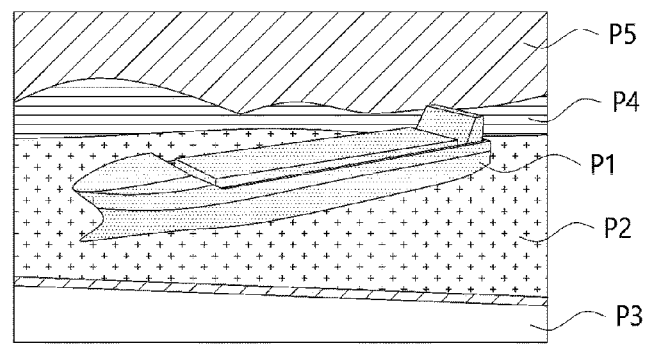

FIGS. 8 and 9 are diagrams related to an example of the object recognition according to the embodiment.

FIG. 8 is a view illustrating an image captured by a camera, and an object may be recognized as shown in FIG. 9 through the object recognition.

Specifically, FIG. 9 is view illustrating a segmentation image (or an image obtained by visualizing a segmentation image) generated on the basis of image segmentation, and illustrating which object a corresponding pixel corresponds to for each pixel of the image. In this case, the object recognition step may mean a segmentation step.

Segmentation may mean assigning, labelling, and matching characteristics or attributes corresponding to a pixel for each image pixel. For example, when a segmentation image is generated from an original image by performing the segmentation, it may be considered that identification values reflecting the characteristics/attributes of a corresponding pixel on the original image are assigned to each pixel of the segmentation image. As a result, the segmentation image may be viewed in a form of a matrix to which each identification value is assigned. Examples of the characteristics/attributes include information on a type, a position, a coordinate, a distance, a direction, speed, and the like of an object corresponding to relevant pixels, but are not limited thereto.

Referring to FIGS. 8 and 9, a segmentation image as shown in FIG. 9 may be obtained by performing segmentation based on an image captured by the camera of FIG. 8. In FIG. 9, a first pixel area P1 is an image area of pixels corresponding to a vessel, a second pixel area P2 is an image area of pixels corresponding to water (e.g., the sea, a river, a lake, etc.), a third pixel area P3 is an image area of pixels corresponding to a wharf wall of a harbor, a fourth pixel area P4 is an image area of pixels corresponding to a terrain (e.g., a mountain, land, etc.), and a fifth pixel area P5 is an image area of pixels corresponding to the sky. Different identification values may be respectively assigned to different pixel areas of the segmentation image. For example, identification values corresponding to a vessel may be assigned to a first pixel area P1 and identification values corresponding to water may be assigned to a second pixel area P2, and likewise, identification values may be assigned to other pixel areas.

FIG. 9 illustrates that information on an object type corresponding to each pixel in the image is calculated by performing segmentation, but information that can be acquired through segmentation is not limited thereto. For example, the characteristics, such as location, coordinates, distance, and direction, of the object may be acquired through segmentation. In this case, different characteristics/attributes may be expressed independently such as labeled with separate identification values or simultaneously reflected such as labeled with one identification value.

FIG. 10 is a table related to labeling that simultaneously reflects information on the types of objects and information on the distances of objects. Referring to FIG. 10, classes may be set considering the information on the type of objects and the information on the distance of objects, and an identification value may be assigned to each class. For example, a second identification value may be assigned considering a short distance, which is the information on distances of the objects, and a topographic feature, which is the information on types of the objects. FIG. 10 is an example of a case in which the type information and the distance information are considered together, and other information such as direction information, an obstacle movement direction, velocity, and a sea mark may also be considered. Also, not all identification values should include a plurality of pieces of information and should include the same type of information. For example, a specific identification value may include only the type information (e.g., identification value "1" does not include the distance information), and another identification value may include the type information and the distance information. Depending on the case, it may be expressed in various ways. For another example, other classes such as a tug, a rope, a side and a deck of a vessel may be added to the class or the class may be modified to other classes.

Figure 11:
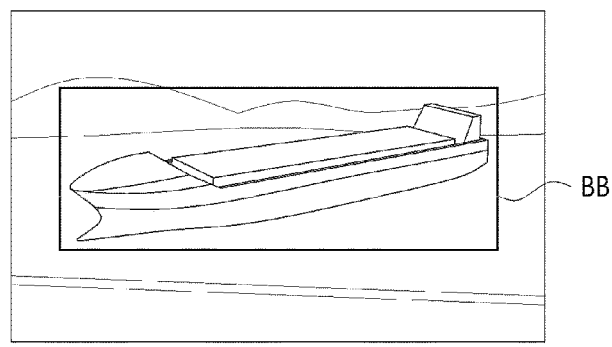
FIG. 11 is a diagram related to another example of the object recognition according to the embodiment.

FIG. 11 is a diagram related to another example of the object recognition according to the embodiment.

Specifically, FIG. 11 illustrating where an object is present in the image is shown as a bounding box, which is also referred to as detection. In this case, the object recognition step may refer to a detection step. Compared to the segmentation, the detection may be regarded as detecting where an object is included in the image in the form of a box rather than calculating characteristics for each pixel of the image. Referring to FIGS. 8 and 11, detection based on the image captured by the camera of FIG. 8 may be performed to acquire a detection image as shown in FIG. 11. In FIG. 11, it can be seen that a vessel is detected in the image and the location of the vessel is expressed as a rectangular bounding box (BB). FIG. 11 shows that only one object is detected, but two or more objects may be detected in one image.

The segmentation and the detection may be performed using an artificial neural network. The segmentation and the detection may be performed through a single artificial neural network. Alternatively, the segmentation and the detection may be performed through each of a plurality of artificial neural networks, and then a final result may be calculated by combining the results.

An artificial neural network is an algorithm modeled after the neural network structure of human brain, and the artificial neural network may include one or more layers including one or more nodes or neurons, and the nodes may be connected through synapses. Data input to the artificial neural network (input data) may be passed through synapses and output through nodes (output data), and information may be obtained accordingly.

The types of artificial neural networks include a convolutional neural network (CNN) which extracts features using a filter and a recurrent neural network (RNN) which has a structure in which an output of a node is fed back as an input, and there are various types of artificial neural networks, such as a restricted Boltzmann machine (RBM), a deep belief network (DBN), a generative adversarial network (GAN), and a relation network (RN), and not limited thereto.

Before using an artificial neural network, it is necessary to train the artificial neural network. Alternatively, it is possible to train an artificial neural network while using another artificial neural network. In the following, a step of training an artificial neural network will be referred to as a training step, and a step of using the artificial neural network will be referred to as an inference step.

The artificial neural network may be trained through various methods such as supervised learning, unsupervised learning, reinforcement learning, and imitation learning.

Figure 12:
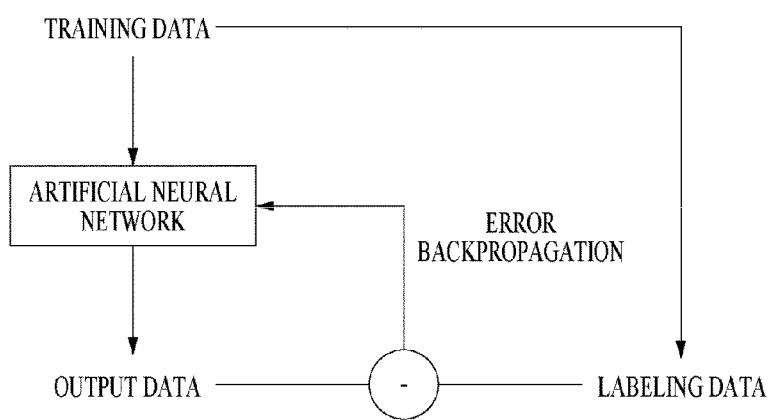
FIGS. 12 and 13 are diagrams related to a training step and an inference step of an artificial neural network according to the embodiment.
Figure 13:
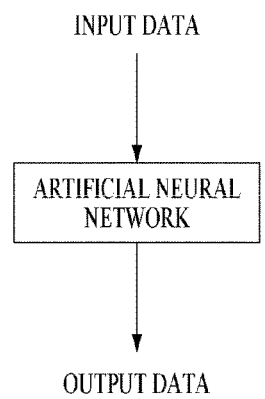

FIGS. 12 and 13 is a diagram related to a training step and an inference step of an artificial neural network according to an embodiment.

FIG. 12 is an embodiment of a training step of an artificial neural network. An untrained artificial neural network may receive learning data or training data and transmit output data. Then, the artificial neural network may be trained by comparing the output data to labeling data and back propagating the error. The learning data, the output data, and the labeling data may be images. The labeling data may include ground truth. Alternatively, the labeling data may be data generated through a user or a program.

FIG. 13 is an exemplary embodiment of an inference step of an artificial neural network, and a trained artificial neural network may receive input data and output output data. Information which is inferable in the inference step may vary according to information of training data in a training step. Also, the accuracy of the output data may vary according to the degree of training of the artificial neural network.

Object recognition is not limited to the above description and may be realized in another method. For example, although it has been described that the identification values are used for the object recognition for convenience of description, the identification values are only used as one type of index. For example, an index with a type of a vector rather than a value may be used for the object recognition. Training data, output data, and labeling data of an artificial neural network may be vector type data.

As described above, the monitoring method may include obtaining berthing guide information. The obtaining of the berthing guide information may mean a step in which the monitoring device obtains the berthing guide information on the basis of a segmentation/detection image, but the monitoring method does not necessarily include generating a segmentation/detection image, and the berthing guide information may be obtained directly from a harbor image.

According to the embodiment, the device may provide berthing guide information for a vessel. The berthing guide information may be used for berthing of a vessel, and may refer to information for assisting or guiding a user, such as a pilot or a captain, to perform the berthing. The berthing guide information may include information about a distance/velocity. Examples of information on the distance/velocity include an absolute location such as coordinates, a relative location from a specific reference, a distance from an arbitrary point, a distance range, a direction, an absolute velocity, a relative velocity, speed, and the like, but are not limited thereto.

Information related to the distance/velocity may be estimated based on an area or a point. As an example, the distance between a vessel and a quay wall may be estimated by calculating the distance between one point of the vessel and one point of the quay wall or may be estimated by calculating the shortest distance between one point of the vessel and the quay wall. As another example, the gap between vessels may be estimated by calculating the distance between one point of the first vessel and one point of the second vessel. One point of the vessel may correspond to one point of the vessel in contact with the sea or to the bow or stem of the vessel, but not limited thereto.

The information on the distance/speed may be expressed such as a distance value, a direction value, and a speed value, which are predetermined. For example, distance information may be expressed as 1 m, 2 m, etc., and direction information may be expressed as 10° (degrees), 20° (degrees), etc., and speed information may be expressed as 5 cm/s, 10 cm/s, or the like.

The information on the distance/velocity may be expressed as indices corresponding to a plurality of categories having a predetermined range. For example, the distance information may be expressed as a short distance, a middle distance, and a long distance, the direction information may be expressed as a left direction, a front direction, and a right direction, and the speed information may be expressed as low speed, medium speed, high speed, Combination of the said information may be applicable to express a left near field, a right far field, and the like.

Figure 14:
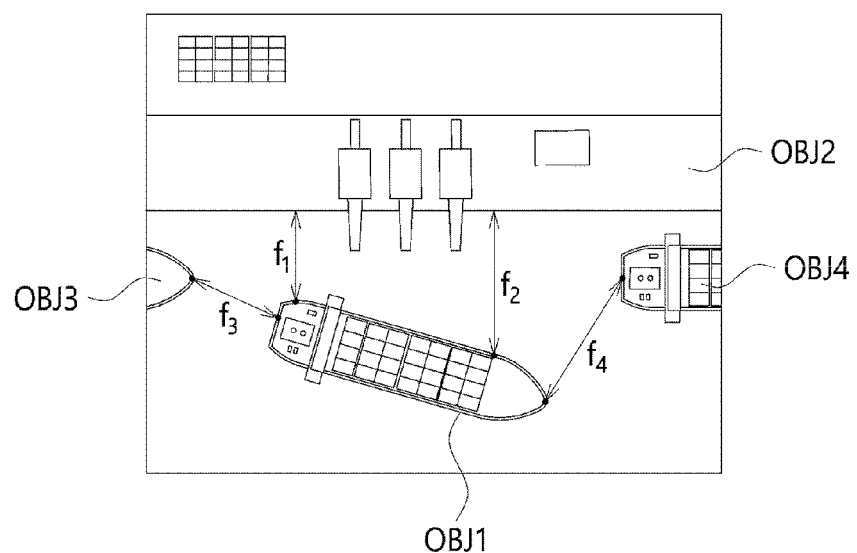
FIGS. 14 and 15 are diagrams illustrating berthing guide information according to the embodiment.
Figure 15:
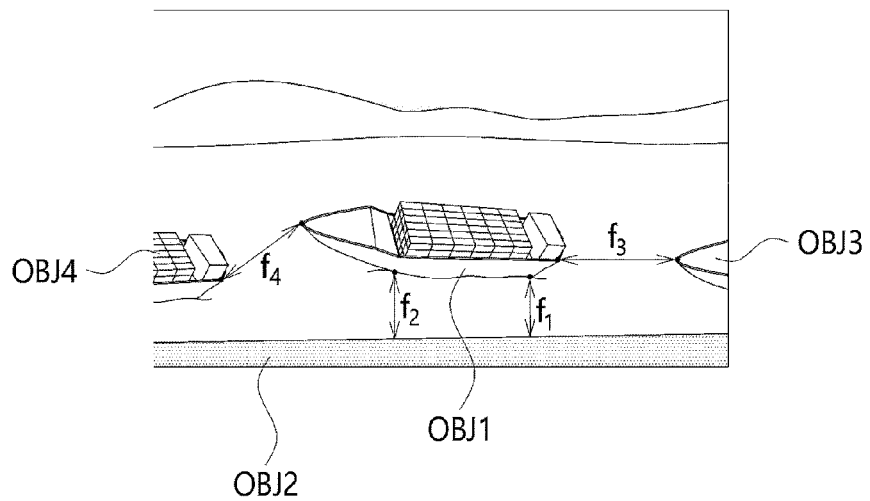

FIGS. 14 and 15 are diagrams illustrating the berthing guide information according to the embodiment. Referring to FIG. 14, the berthing guide information may include berthing guide information f1 and f2 between a vessel OBJ1 and a wharf wall OBJ2, and berthing guide information f3 and f4 between the vessel OBJ1 and other vessels OBJ3 and OBJ4. Specifically, the berthing guide information f1 and f2 between the vessel OBJ1 and the wharf wall OBJ2 may include information on the distance/speed of the vessel OBJ1 to the wharf wall OBJ2, and the berthing guide information f3 and f4 between the vessel OBJ1 and other vessels OBJ3 and OBJ4 may include information on the distance/speed of the vessel OBJ1 to the other vessels OBJ3 and OBJ4. Referring to FIG. 15, the berthing guide information f1 and f2 between the vessel OBJ1 and the wharf wall OBJ2 may be information between the wharf wall OBJ2 and a border area corresponding to an area where the vessel OBJ1 is in contact with the sea level. The border area may include not only lines or points at which the vessel and the sea level come into contact with each other, but also a predetermined area near the lines or the points. In addition, the berthing guide information between the vessel OBJ1 and the other vessels OBJ3 and OBJ4 may be information between predetermined areas corresponding to the respective bows and stems of the vessels OBJ1, OBJ3, and OBJ4, wherein the predetermined areas may mean not only the bow/stem points of the vessels OBJ1, OBJ3, and OBJ4, but also predetermined areas in the vicinity thereof.

The berthing guide information f1 and f2 between the vessel OBJ1 and wharf wall OBJ2 may include two pieces of berthing guide information as shown in FIGS. 14 and 15, but is not limited thereto, and may include one piece of berthing guide information, or three or more pieces of berthing guide information. In addition, the berthing guide information f3 and f4 between the vessel OBJ1 and the other respective vessels OBJ3 and OBJ4 may include one piece of berthing guide information between two vessels as shown in FIGS. 14 and 15, but is not limited thereto, and may include two or more pieces of berthing guide information between two vessels. The above-described information may be referred to as unberthing guide information when used in unberthing of a vessel.

Figure 16:
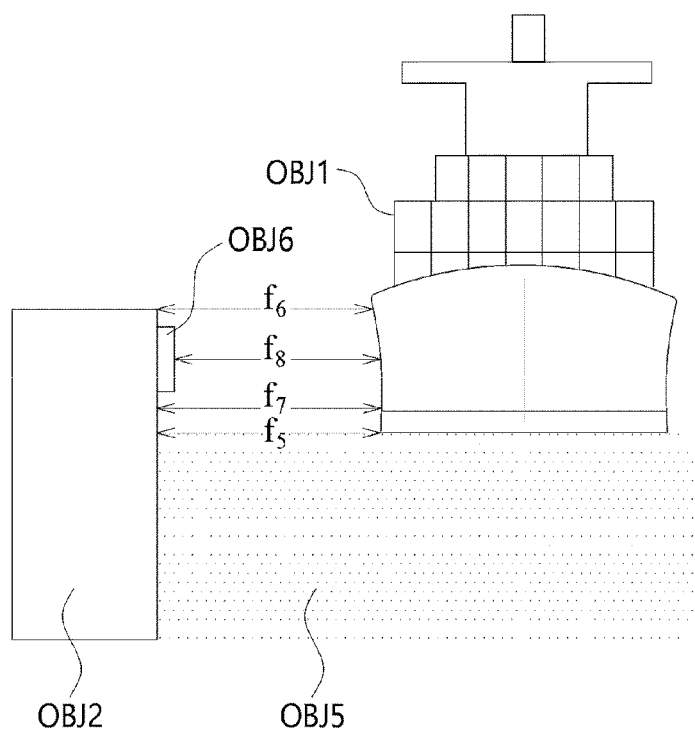
FIG. 16 is a diagram illustrating berthing guide information on berthing between a vessel and a wharf wall according to the embodiment.

FIG. 16 is a diagram illustrating berthing guide information on berthing between a vessel and a wharf wall according to the embodiment.

The berthing guide information may be information on a sea level height/sea level. For example, berthing guide information f5 may include information on a distance/speed between the vessel OBJ1 and the wharf wall OBJ2 at the sea level height.

The berthing guide information may be information at a ground level height (or a height of a wharf wall). For example, the berthing guide information f6 may include information on a distance/speed between the vessel OBJ1 and the wharf wall OBJ2 at a height of the wharf wall OBJ2.

The berthing guide information may be information at a predetermined height. Here, the predetermined height may be defined between the sea level height and the height of the wharf wall, as in the berthing guide information f7 shown in FIG. 16, but is not limited thereto.

The berthing guide information between the vessel and the wharf wall may be information f8 between a bumper OBJ6 installed between the vessel OBJ1 and the wharf wall OBJ2. Since the vessel OBJ1 collides with the bumper OBJ6 when berthing or comes into contact with the bumper OBJ6 when anchoring, it may be advantageous to obtain the information f8 on a distance/speed between the vessel OBJ1 and the bumper OBJ6. In FIG. 16, the bumper OBJ6 is shown to be installed at a position higher than the sea level, but at least a portion of the bumper OBJ6 may be installed to be submerged in the sea OBJ5. In this case, the berthing guide information may include information on a distance/speed between the vessel and the bumper at the sea level height.

The berthing guide information between the vessel and other vessels may include information on the distances/speeds between the vessel and the other vessels at the sea level height. The berthing guide information between the vessel and the other vessels may include information on the distances/speeds between the vessel and the other vessels at a predetermined height. Here, the predetermined height may be determined in consideration of a shape of the hull. For example, the predetermined height may be a height of an area in which a vessel protrudes in a direction of the other vessels. In this case, it may be advantageous to berthing guide by more accurately identifying a possibility of collision between the vessels.

According to the embodiment, the device may calculate berthing guide information on the basis of LIDAR data. For example, the device may calculate a distance/velocity to an object by using the three-dimensional coordinates of LIDAR points included in the obtained LIDAR data. Examples of objects may include vessels, the sea and land, harbors, wharf walls, buoys, terrain, the sky, buildings, people, animals, and the like.

According to the embodiment, the berthing guide information may be calculated on the basis of an image. Here, the image may be an image generated by an image generation unit such as a camera, or an image processed through image segmentation from the generated image. For example, the information on the distance/velocity of a vessel may be calculated on the basis of an image including a vessel, the sea and land as objects, or the information on distance/speed of the vessel may be calculated on the basis of a segmentation image generated from the image through segmentation. Examples of objects may include harbors, wharf walls, buoys, terrain, the sky, buildings, people, animals, and the like, in addition to the vessels and the sea and land.

Hereinafter, an object for estimating berthing guide information is referred to as a target object. For example, in the above example, a vessel may be the target object. In addition, there may be a plurality of target objects. For example, when a distance or speed of each of a plurality of vessels included in an image is estimated, the plurality of vessels may be the target objects.

According to an embodiment, the berthing guide information may be calculated based on an image pixel. When the berthing guide information is calculated based on a point as described above, a point in the image may correspond to a pixel. Therefore, the berthing guide information may be calculated based on the gap between image pixels.

Information related to a distance between points may be calculated based on the gap between pixels. As an example, a certain distance may be assigned to each gap between pixels, and the distance between points may be calculated in proportion to the gap between pixels. As another example, the distance between pixels may be calculated based on a coordinate value of a pixel in the image, and the distance between points may be calculated based on the distance between pixels.

Information related to a velocity between points may be calculated based on the change in the information related to the distance between the points. In this case, the movement information may be calculated based on a plurality of images or video frames. For example, the information related to the velocity between points may be calculated based on the distance between points in the previous frame, the distance between points in the current frame, and a time interval between frames.

Figure 17:
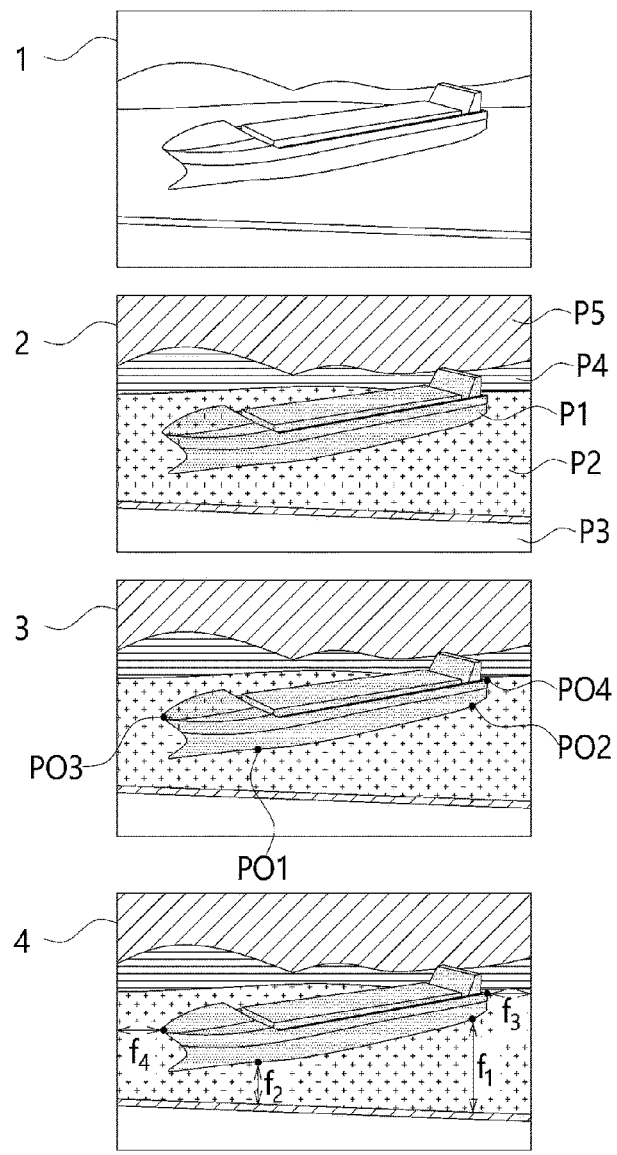
FIG. 17 is a diagram illustrating a method of obtaining the berthing guide information according to the embodiment.

FIG. 17 is a diagram illustrating a method of obtaining berthing guide information according to the embodiment. The obtaining of the berthing guide information may include: step (1) of obtaining an image generated by an image generation unit such as a camera; step (2) of generating a segmentation image (or an image obtained by visualizing a segmentation image) by performing image segmentation on the image; step (3) of finding points PO1, PO2, PO3, and PO4, which calculate the berthing guide information on the basis of the segmentation image; and step (4) of calculating the berthing guide information f1, f2, f3, and f4 respectively corresponding to the points. In FIG. 17, the method for calculating the berthing guide information from the segmentation image has been described, but this method is only an embodiment, and it may be possible to find the points on the basis of the image generated by the image generation unit and calculate the berthing guide information without the generating of the segmentation image.

The obtaining of the berthing guide information may include performing viewpoint transformation on an image. For example, the obtaining of the berthing guide information may generate a segmentation image by performing segmentation on the viewpoint-transformed image through the performing of the viewpoint transformation on the image after the obtaining of the image generated by the image generation unit, or may calculate the berthing guide information with respect to the segmentation image performed by the viewpoint transformation through the performing of the viewpoint transformation on the segmentation image after the generating of the segmentation image. Hereinafter, the viewpoint transformation will be described.

Generally, an image generated by the image generation unit, such as a camera, may appear as a perspective view. Transforming a perspective view into a top view, a side view, and another perspective view may be referred to as viewpoint transformation. It will be appreciated that a top-view image or a side-view image may be transformed into another viewpoint and that the image generation unit may generate a top-view image, a side-view image, or the like. In this case, it may not be necessary to perform the viewpoint transformation.

Figure 18:
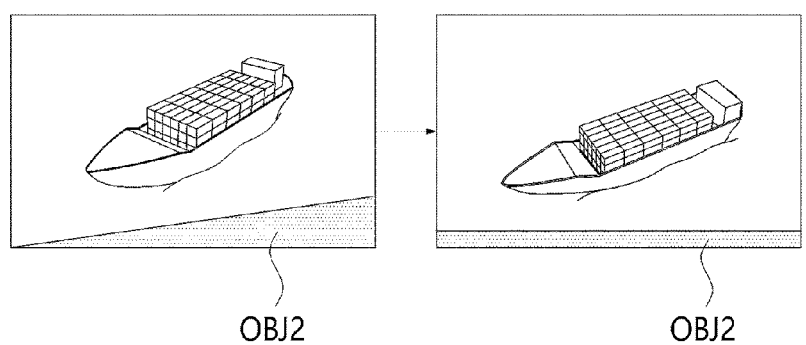
FIGS. 18 and 19 are diagrams related to viewpoint transformation according to the embodiment.
Figure 19:
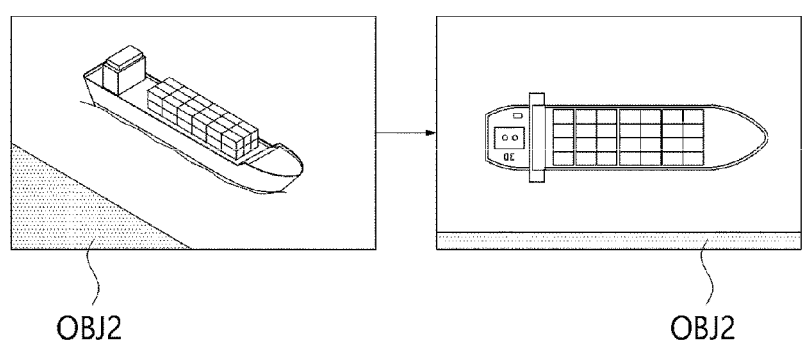

FIGS. 18 and 19 are diagrams related to viewpoint transformation according to an embodiment. Referring to FIG. 18, through the viewpoint transformation of a perspective-view image, another perspective-view image may be acquired. Here, the viewpoint transformation may be performed such that the quay wall OBJ2 is horizontally (transversely) located in the image in a horizontal direction. Referring to FIG. 19, through the viewpoint transformation of a perspective-view image, a top-view image may be acquired. Here, the top-view image may be a view by looking down on the sea vertically from the top. Also, as in FIG. 18, the viewpoint transformation may be performed so that the quay wall OBJ2 is horizontally located in the image.

It may be possible to improve the ease, convenience, and accuracy of calculating the berthing guide information through the viewpoint transformation. For example, when a top-view image is used in the case of pixel-based distance calculation, a distance corresponding to the gap between pixels may be the same in the entirety or at least a portion of the image.

As an example of the viewpoint transformation, inverse projective mapping (IPM) may be performed. A two-dimensional (2D) image may be generated by light that is reflected by a subject in a three-dimensional (3D) space and that is incident on an image sensor through a lens of a camera, and the relationship between 2D and 3D depends on the image sensor and the lens, and may be expressed, for example, as shown in Equation 1.

$$s\begin{bmatrix}u\\v\\1\end{bmatrix}=\begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix} \quad \text{Equation 1}$$

Here, the matrix on the left side indicates 2D image coordinates, the first matrix on the right side indicates intrinsic parameters, the second matrix indicates external parameters, and the third matrix indicates 3D coordinates. Specifically, fx and fy represent focal lengths, cx and cy represent principal points, and r and t represent rotation and translation transformation parameters, respectively.

By projecting a 2D image onto an arbitrary plane in three dimensions through inverse projection transformation, it may be possible to change the viewpoint of the 2D image. For example, through inverse projection transformation, a perspective-viewpoint image may be transformed into a top-view image or another perspective-viewpoint image.

Intrinsic parameters may be required for viewpoint transformation. As an example of a method of finding intrinsic parameters, Zhang's method may be used. Zhang's method, which is a type of polynomial model, is a method of capturing a grid with a known grid size at various angles and distances to acquire intrinsic parameters.

Information on the location and/or orientation of the image generation unit/the sensor module, which has captured images, may be required for viewpoint transformation. Such information may be acquired from the location measurement unit and the orientation measurement unit.

Alternatively, information on the location and/or orientation may be acquired based on the location of a fixture included in the image. For example, at a first time point, the image generation unit may be positioned at a first location and a first orientation to generate a first image including a target fixture, which is a fixed object such as a topographic feature or a building. Subsequently, at a second time point, the image generation unit may generate a second image including the target fixture. A second location and a second orientation, which is the location and/or orientation of the image generation unit at the second time point, may be calculated by comparing the location of the target fixture in the first image and the location of the target fixture in the second image.

The acquisition of the information on location and/or orientation for viewpoint transformation may be performed at predetermined time intervals. Here, the time interval may vary depending on the installation location of the image generation unit/the sensor module. For example, when the image generation unit/the sensor module is installed in a moving object such as a vessel, there may be a need to acquire the information on location and/or orientation at short time intervals. On the other hand, when the image generation unit/the sensor module is installed in a fixture such as a harbor, the information on location and/or orientation may be acquired at relatively long time intervals or only once initially. When an object, such as a crane, is repeatedly moved and stopped, the information on location and/or orientation may be acquired only after the movement. Also, the time interval for acquiring the information on location and/or orientation may be changed.

The device may perform viewpoint transformation on an image on the basis of a reference plane. For example, the device may perform the viewpoint transformation for the image by using a plane, having a wharf wall located therein and parallel to the sea level, as the reference plane. Here, the reference plane may depend on the calculated sea level height. Naturally, the device is not limited to the above description, and the viewpoint transformation may also be performed for the image by using other planes, such as parts of a vessel (e.g. a reference plane at a deck height), as the reference plane other than the plane where the sea level and the wharf wall are located.

Also, the above-described viewpoint transformation method is for illustrative purposes only, and viewpoint transformation may be performed in a different method. Viewpoint transformation information includes information necessary for the viewpoint transformation, such as the matrix, parameter, coordinates, and location and/or orientation information of Equation 1 above.

The berthing guide information may be calculated in consideration of sea level information that reflects a sea level height. The device may monitor a vessel or a harbor in consideration of the sea level height.

In the present specification, the sea level information is information related to the sea level height, and refers to various information that may be changed according to sea level height changes, such as a distance between the sea level and the ground, a distance between the sea level and a wharf wall, a distance between the sea level and a monitoring device (e.g., an image generation unit), and a length of an object exposed above the sea level, in addition to an absolute sea level height.

Figure 20:
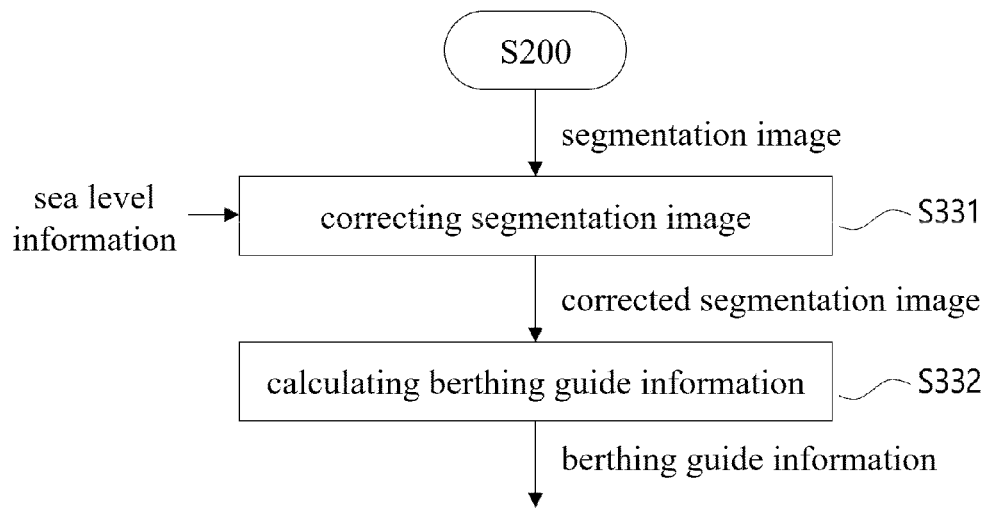
FIGS. 20 to 29 are diagrams illustrating the obtaining of the berthing guide information in consideration of sea level information according to the embodiment.
Figure 21:
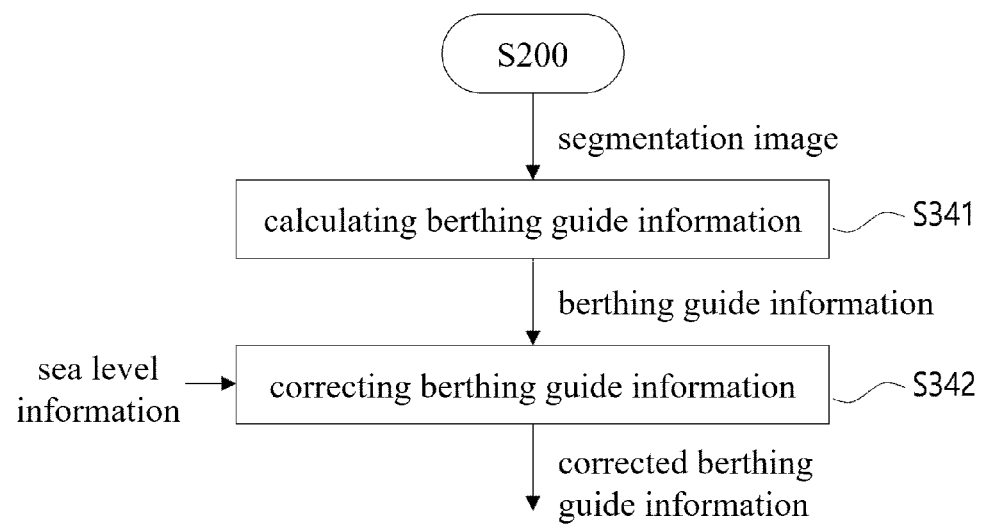

FIGS. 20 to 29 are diagrams illustrating the step of obtaining berthing guide information in consideration of sea level information according to the embodiment. FIGS. 20 and 21 are diagrams illustrating a case in which a viewpoint transformation step is not included. FIGS. 22 to 29 are diagrams illustrating a case in which the viewpoint transformation step is included.

Referring to FIG. 20, the obtaining of the berthing guide information according to the embodiment may include: step S331 of correcting a segmentation image, which is generated in step S200 of generating the segmentation image, in consideration of sea level information; and step S332 of calculating berthing guide information on the basis of the corrected segmentation image. Referring to FIG. 21, the step of obtaining berthing guide information according to the embodiment may further include: step S341 of calculating berthing guide information on the basis of the segmentation image; and step S342 of correcting the calculated berthing guide information in consideration of the sea level information.

Figure 22:
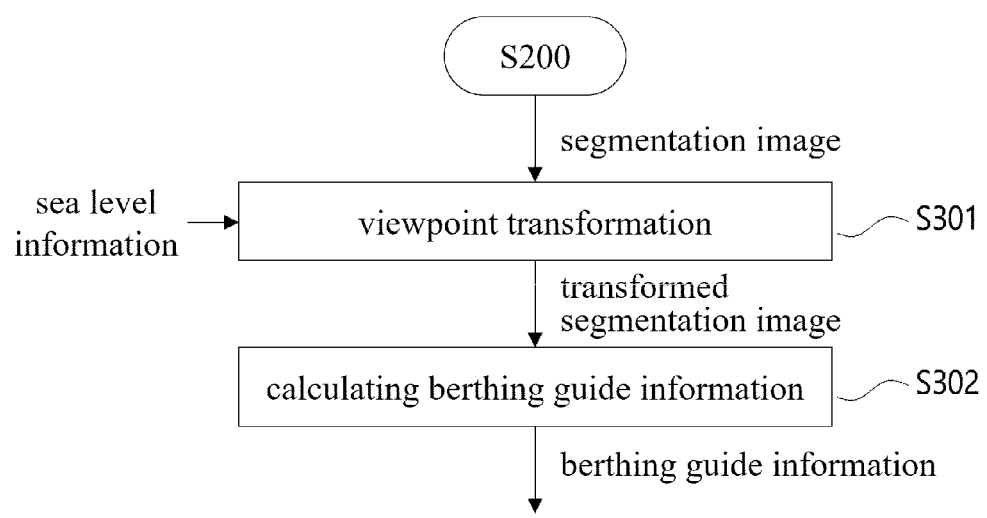
Figure 23:
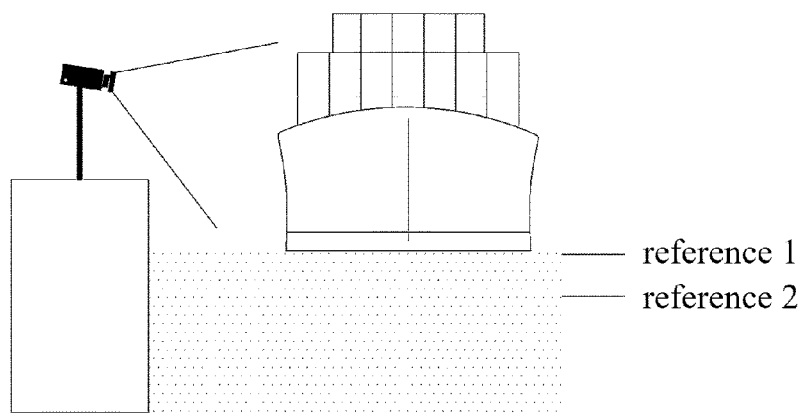
Figure 24:
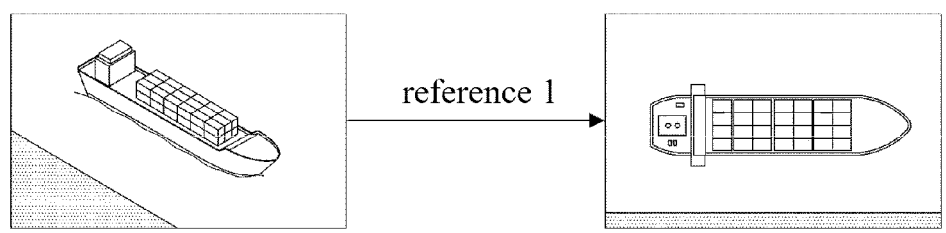
Figure 25:
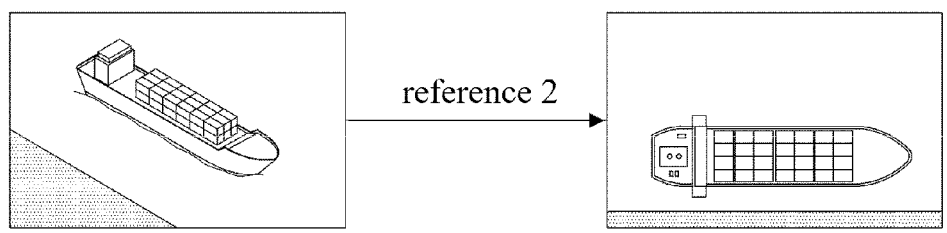

Referring to FIG. 22, the step of obtaining berthing guide information according to the embodiment may include: step S301 of performing viewpoint segmentation for the segmentation image generated in step S200 of generating a segmentation image in consideration of sea level information and; and step S302 of calculating berthing guide information on the basis of the transformed segmentation image. In the viewpoint transformation step, the image transformed according to the setting of reference planes/reference heights may be different. FIGS. 23 to 25 are diagrams related to viewpoint transformation in the reference planes/reference heights different from each other, and even with the same image, images transformed according to the references of the viewpoint transformation may be different from each other. For example, the images on the left of FIGS. 24 and 25 are the same, but the images transformed according to the references at a time of the viewpoint transformation have different relative positions of a vessel with respect to a wharf wall, as in the respective images on the right of FIGS. 24 and 25. In this case, since the berthing guide information of the target vessel is also changed, the setting of the references plane/reference heights may be important in order to calculate accurate berthing guide information, and such reference planes/reference heights may depend on the sea level height. Accordingly, when the viewpoint transformation is performed in consideration of the sea level information, the accuracy of the berthing guide information may be increased.

As shown in FIGS. 23 to 25, the reference planes may be planes parallel to the sea level, but is not limited thereto.

In order to consider the sea level information, the viewpoint transformation may be performed by updating the viewpoint transformation information according to the sea level information whenever berthing guide information is calculated. Alternatively, the viewpoint transformation information may be updated by reflecting the sea level information according to a predetermined time interval. Here, it is not necessary to update all parameters of the view transformation information, but only some of the parameters may be updated.

Figure 26:
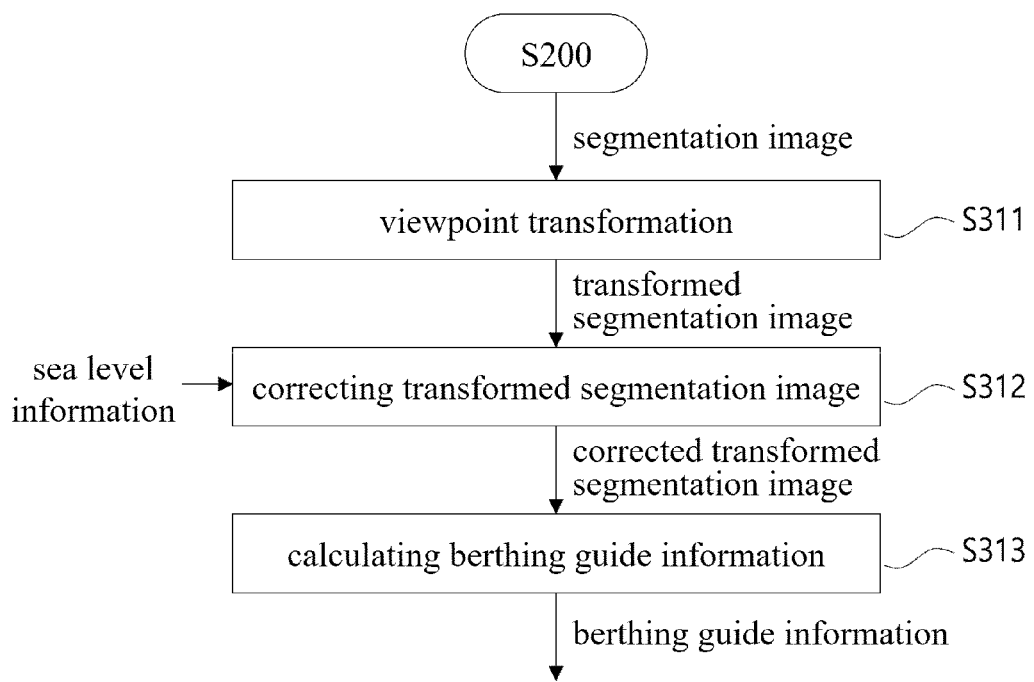
Figure 27:
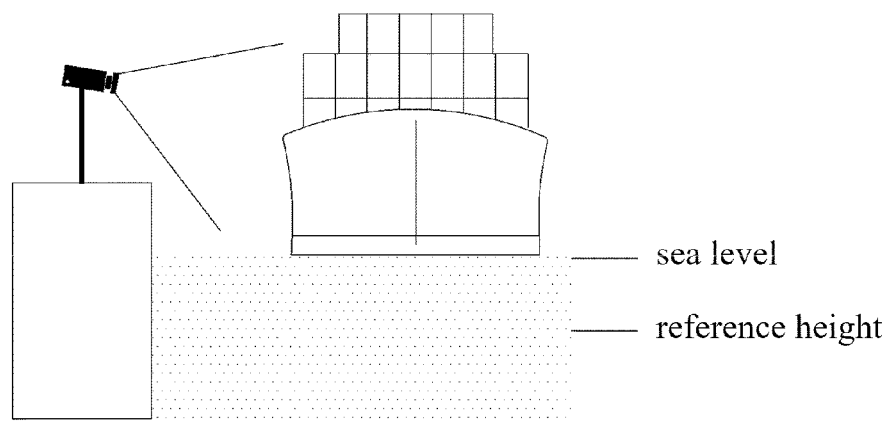
Figure 28:
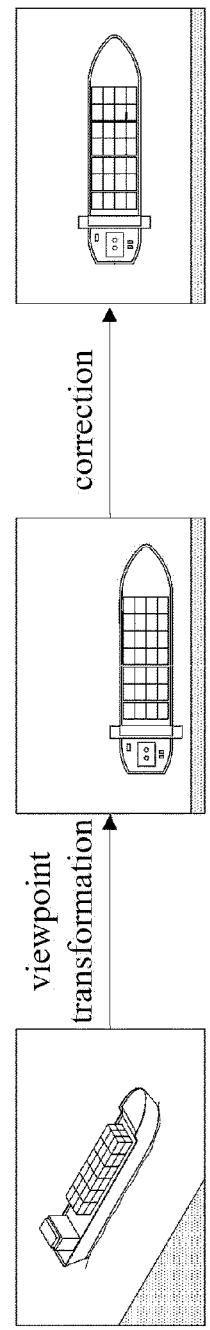

Referring to FIG. 26, the step of obtaining berthing guide information according to the embodiment may include: step S312 of correcting the transformed segmentation image generated in step S311 of performing viewpoint transformation in consideration of the sea level information; and step S313 of calculating berthing guide information on the basis of the corrected and transformed segmentation image. FIGS. 27 and 28 are diagrams related to image correction for calculating berthing guide information on a sea level height/a sea plane according to the embodiment, and are diagrams illustrating that the berthing guide information is calculated after performing viewpoint transformation on a segmentation image with respect to a reference plane/a reference height and correcting the transformed segmentation image in consideration of the sea level information. As a difference between the sea level height and the reference height is large, a difference between the images before and after correction may be large.

Figure 29:
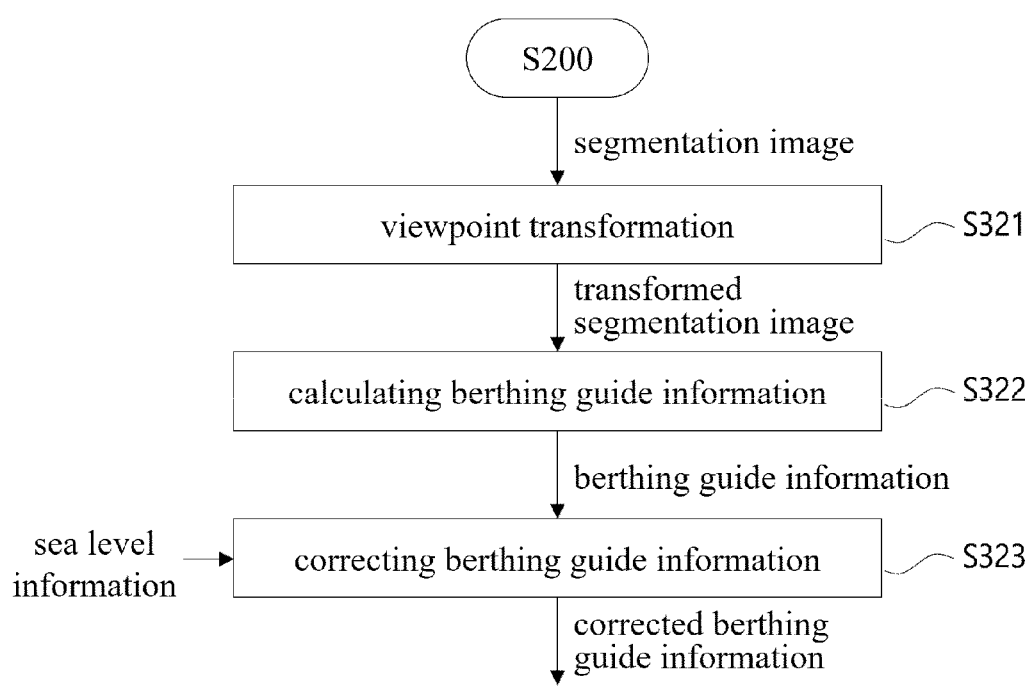
Figure 30:
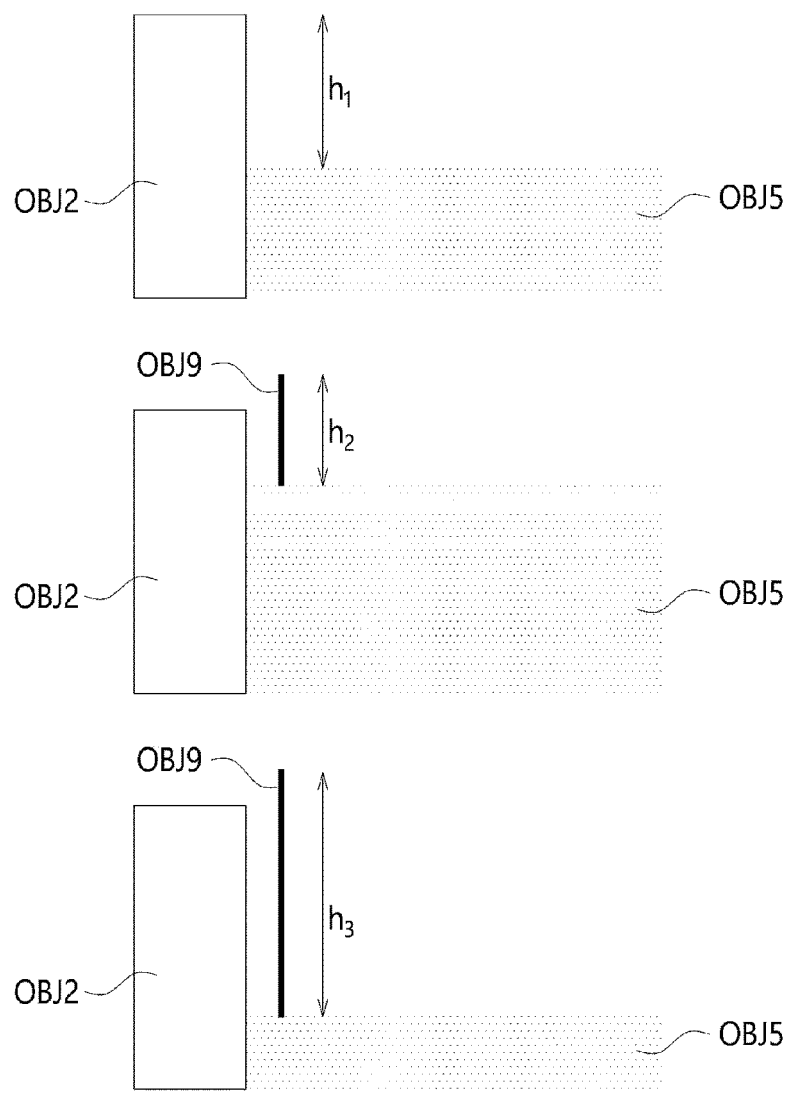

Referring to FIG. 29, the step of obtaining berthing guide information according to the embodiment may include: step S321 of performing viewpoint transformation on a segmentation image; step S322 of calculating berthing guide information on the basis of the transformed segmentation image; and step S323 of correcting the calculated berthing guide information in consideration of sea level information.

Consideration of the sea level information in FIGS. 22, 26 and 29 may be performed by merging the sea level information. In FIGS. 22, 26 and 29, the sea level information is only considered in step S301 of performing viewpoint transformation, step S312 of correcting a transformed segmentation image, and step S323 of correcting berthing guide information, respectively. However, the sea level information may be considered in at least one or more steps of the performing of the viewpoint transformation, the correcting of the transformed segmentation image, and the correcting of the berthing guide information. For example, the above-described method for considering the sea level information may be used in various combinations in such a method that the viewpoint transformation step is performed in consideration of the sea level information, the berthing guide information is calculated accordingly, and then the sea level information is considered again, thereby correcting the berthing guide information.

In FIGS. 20 to 29, the method has been described as obtaining the berthing guide information on the basis of the segmentation image, but the obtaining of the berthing guide information is not limited thereto, and the berthing guide information may be obtained from a harbor image without generating a segmentation image.

In order to calculate berthing guide information in consideration of sea level information, it may be necessary to obtain the sea level information beforehand.

The device may calculate a sea level height for the vessel and/or harbor monitoring. For example, the device may calculate the sea level height from the obtained sensor data, and use the calculated sea level height for the vessel or harbor monitoring. For example, the device may use the sea level height as information of a height up to a projection plane during viewpoint transformation or reverse projection transformation of a camera image. For another example, the device may use the sea level height as a variable when an image for matching a camera image is transformed. As yet another example, the device may use the sea level height as a variable of data transformation when the device merges LIDAR data and a camera image.

FIGS. 30 to 43 are diagrams related to examples of obtaining sea level information according to the embodiment. Hereinafter, various embodiments related to the obtaining of the sea level information will be described on the basis of FIGS. 30 to 43, but the method of obtaining the sea level information is not limited thereto.

Sea level information may be obtained on the basis of characteristics (e.g., a length, an area, etc.) of an object exposed above the sea level. As an example, referring to an image at the top of FIG. 30, sea level information may be calculated on the basis of an exposure length h1 of the wharf wall OBJ2 exposed above the sea OBJ5. It may be seen that the sea level height decreases when the exposure length h1 increases and the sea level height increases when the exposure length h1 decreases, and the degree of increase or decrease in the sea level height may also be calculated numerically when a value of the exposure length h1 is measured. As another example, referring to respective images in the middle and at the bottom of FIG. 30, sea level information may be calculated on the basis of exposure lengths h2 and h3 of an object OBJ9 exposed above the sea OBJ5. Here, a height measurement object OBJ9, which is the object OBJ9 necessary for calculating sea level information, has no limitations as long as the height measurement object OBJ9 is an object not only a pole and the like installed for this use, but also an object whose length exposed over the sea changes according to a change in the sea level height. As the sea level height changes, the exposure length increases from h2 to h3 or decreases from h3 to h2, and the degree of increase or decrease in the sea level height may be calculated by measuring the exposure length.

The sea level information based on the characteristics of the height measurement object may be obtained by using an image. When the image includes a height measurement object, characteristics such as a length of the height measurement object may be obtained by analyzing the image, and sea level information may be calculated on the basis of these characteristics.

For example, the sea level information may be calculated according to the number of pixels corresponding to the height measurement object. When the number of pixels is increased, this is meant to be a fact that the length of the height measurement object exposed above the sea level is long, so it may be seen that the sea level height is decreased. Here, the pixels corresponding to the height measurement object may be determined through image segmentation, but is not limited thereto.

Sea level information may be calculated on the basis of a shaded area corresponding to the sea that is not seen due to occlusion by a wharf wall. For example, when the image generation unit is installed on the wharf wall and disposed to face the sea, a sea area close to the wharf wall may be occluded by the wharf wall and thus may not be monitored by the image generation unit. The sea level information may be obtained on the basis of characteristics (e.g., a length, an area, etc.) of such a shaded area.

An image on the top of FIG. 31 is a view of a shaded area SA1 when a sea level height is relatively high, and an image at the bottom of FIG. 31 is a view of a shaded area SA2 when the sea level height is relatively low. As the sea level height decreases, the surface area of the shaded area increases, and by measuring this area, sea level information may be calculated.

The sea level information may be calculated on the basis of a plurality of images generated by the same type of image generation unit. For example, the sea level information may be calculated on the basis of a plurality of images generated by a plurality of cameras or may be calculated on the basis of a plurality of images generated by a single camera.

The sea level information may be calculated on the basis of an overlap area that is a monitoring area overlapped between a plurality of images. For example, when the monitoring device includes a plurality of sensor modules/image generation units, the plurality of images may be obtained, and sea level information may be obtained on the basis of characteristics such as a surface area of the overlap area between the plurality of images. Alternatively, when generating a plurality of images each having a monitoring area different due to rotation of one sensor module/image generation unit, sea level information may be obtained on the basis of the characteristics of the respective overlap areas between the plurality of images.

Figure 32:
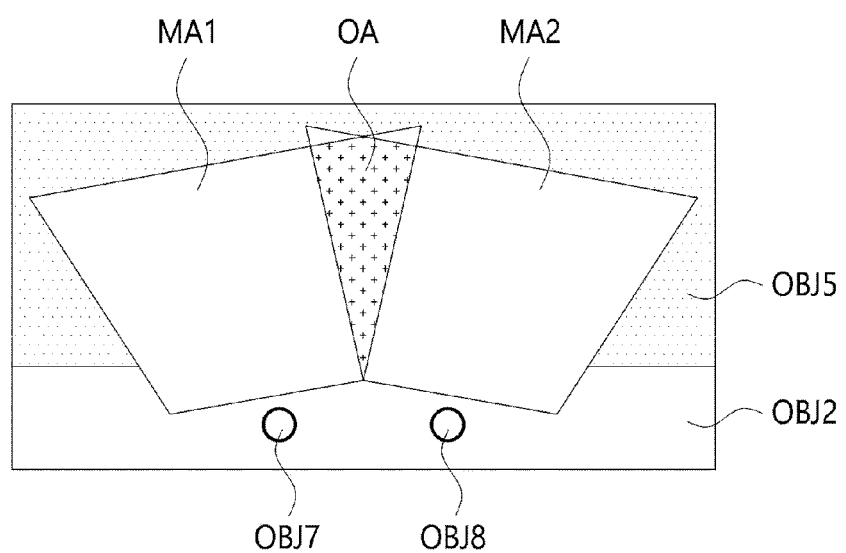

Referring to FIG. 32, monitoring areas MA1 and MA2 respectively corresponding to two cameras OBJ7 and OBJ8 exist, and an overlap area OA may exist depending on installation positions, directions, or the like of the cameras OBJ7 and OBJ8. As the sea level height increases, the surface area of the overlap area may decrease, and as the sea level height decreases, the surface area of the overlap area may increase. Accordingly, the sea level information may be calculated by measuring the surface area of the overlap area.

The overlap area may be determined on the basis of feature points. For example, the feature points may be extracted from a first image and a second image, and an overlap area of the first image and the second image may be determined by matching the feature points.

Sea level information may be calculated on the basis of a plurality of images generated by different types of image generation units. For example, the sea level information may be calculated on the basis of both a camera image generated by a camera and a LIDAR image generated by a LIDAR, or may be calculated on the basis of a camera image and a radar image generated by a radar, but is not limited thereto. Hereinafter, for convenience of description, images generated by different types of image generation units are referred to as a first type image and a second type image, respectively.

Sea level information may be calculated through matching between the first type image and the second type image. For example, the sea level information may be calculated by obtaining positions, distances, and heights of one or more points on the first type image on the basis of the second type image.

As a specific example, describing a case where the first type image and the second type image are respectively a camera image and a LIDAR image, the positions, the distances, and the heights of one or more points on the camera image are obtained on the basis of the LIDAR image, and then are merged with pixel information such as the number of pixels on the camera image, whereby sea level information may be calculated. For example, after pixels on a camera image corresponding to specific points are searched among a point cloud of a LIDAR image and positions, distances, and heights of the pixels are calculated on the basis of the LIDAR image, the sea level information may be calculated in consideration of the number of pixels between the pixels and sea level on the camera image. In this case, the pixels may be pixels positioned higher than the sea level. In addition, the camera image may be an image captured by a camera, or an image processed through viewpoint transformation from the captured image.

Figure 33:
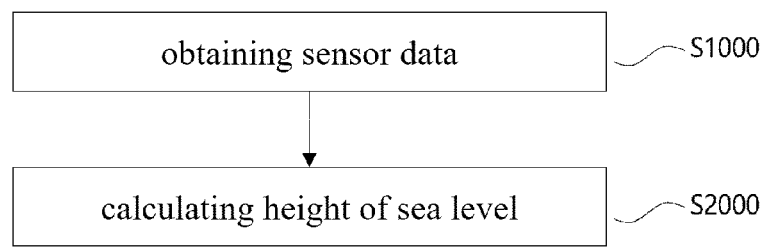

FIG. 33 is a flowchart illustrating a method for calculating a sea level height according to the embodiment.

Referring to FIG. 33, a method for calculating a sea level height according to the embodiment may include step S1000 of obtaining sensor data and step S2000 of calculating the sea level height.

The device may obtain the sensor data in step S1000.

According to the embodiment, the device may obtain an image from a camera. For example, the device may obtain the image from the camera installed on a berth facing the sea. For example, the device may obtain an image of the sea, and when there is a vessel in the sea, it may also obtain an image of the vessel together.

According to the embodiment, the device may obtain LIDAR data from a LIDAR sensor. For example, the device may obtain the LIDAR data from the LIDAR sensor installed on the berth toward the sea. For example, the device may obtain the LIDAR data for the sea, and when a vessel enters the berth, the device may also obtain LIDAR data for the vessel together.

According to the embodiment, the LIDAR sensor may obtain LIDAR data for an area corresponding to an area captured by a camera obtaining an image. For example, the LIDAR sensor may have a field of view that at least partially overlaps a field of view of the camera obtaining the image.

FIG. 34 is an example of obtaining sensor data according to the embodiment. Referring to FIG. 34, the device according to the embodiment may obtain the sensor data for the same area from a LIDAR and a camera, which are installed around a berth. For example, the LIDAR and the camera may be installed on a pier toward or facing the berth, and obtain the data on an area where the berth is located. Here, the field of view of the LIDAR may at least partially overlap the field of view of the camera.

Referring to an image at the top of FIG. 34, the device may obtain an image of the sea, and when there is a vessel in the sea, the device may also obtain an image of the vessel.

Referring to an image at the bottom of FIG. 34, the device may obtain LIDAR data for the sea, and when the vessel enters a berth, the device may also obtain LIDAR data for the vessel. The LIDAR data may include a plurality of LIDAR points captured by a LIDAR sensor. For example, the LIDAR data may include the plurality of LIDAR points for each vertical or horizontal channel.

The device may measure a distance to a vessel or the surface of the sea by using the LIDAR points respectively corresponding to the vessel or the sea from the obtained LIDAR data, and may calculate a sea level height by using the distance.

The device may calculate a sea level height in step S2000.

The device may calculate the sea level height by using the obtained sensor data. For example, the device may calculate the sea level height by using at least one piece of sensor data respectively obtained from a camera and a LIDAR sensor, which are installed on a berth toward the sea.

As an example, the device may obtain a distance to the surface of the sea by using the three-dimensional coordinates of the LIDAR points included in the obtained LIDAR data, and calculate the sea level height by using the obtained distance. The device may calculate the sea level height in consideration of the distance to the surface of the sea, and an installation location, an installation angle, and the like of the LIDAR sensor. As another example, the device may obtain a distance to a vessel area in contact with the surface of the sea by using the three-dimensional coordinates of the LIDAR points included in the obtained LIDAR data, and calculate a sea level height by using the obtained distance. The device may calculate the sea level height in consideration of the distance to the vessel area in contact with the surface of the sea, and the installation location, the installation angle, and the like of the LIDAR sensor.

However, due to cost issues, low-performance LIDAR sensors are often installed in berths, so there is a problem that it is difficult to distinguish which LIDAR points are for a sea area or a vessel area among the LIDAR points of low-resolution LIDAR data. In order to solve this problem, according to the embodiment, the device may match and use the obtained camera image and LIDAR data to calculate the sea level height.

Figure 35:
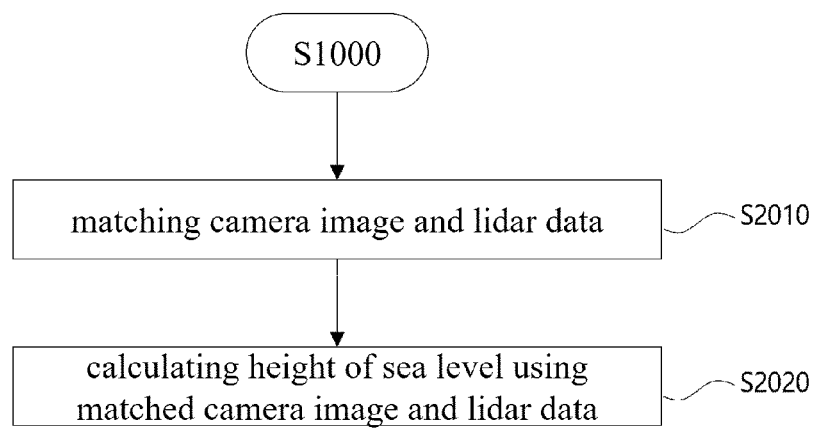

FIG. 35 is a flowchart illustrating a method for calculating a sea level height by using a camera image and LIDAR data, which are matched with each other, according to the embodiment. Referring to FIG. 35, the method for calculating the sea level height by using the matched camera image and LIDAR data according to the embodiment may include: step S2010 of matching the camera image and the LIDAR data; and step S2020 of calculating the sea level height by using the matched camera image and LIDAR data.

In step S2010, the device may match the camera image and the LIDAR data.

According to the embodiment, the device may match the camera image and LIDAR data by using information for matching. For example, the device may match the camera image and the LIDAR data by matching a coordinate system on the camera image with a coordinate system on the LIDAR data. That is, the respective coordinate systems of the camera image and the LIDAR data may be transformed with each other.

The device may match the camera image and the LIDAR data in consideration of the installation location of the camera, the installation angle of the camera, the installation location of the LIDAR sensor, the installation angle of the LIDAR sensor, and the like. Here, the device may match the camera image and the LIDAR data again by reflecting the calculated sea level height. As an example, when the LIDAR data is matched with the camera image, the device may match the camera image and the LIDAR data again by using the calculated sea level height as a data transformation variable.

FIG. 36 is a diagram illustrating an example of matching of a camera image and LIDAR data according to the embodiment. Referring to an image at the top of FIG. 36, it may be seen that the image obtained from the camera installed on a berth and the LIDAR data obtained from a LIDAR sensor scanning the same area as the image obtained from the camera are matched with each other.

According to one embodiment, the device may match a segmentation image with LIDAR data. For example, the device may generate the segmentation image by using an artificial neural network from the image obtained from the camera, and may match the generated segmentation image with the LIDAR data. Referring to the view at the bottom of FIG. 36, it may be seen that the image obtained from the camera installed on the berth and the LIDAR data obtained from the LIDAR sensor scanning the same area as the image obtained from the camera are matched with each other.

The matching of the camera image and the LIDAR data is not limited to the above description, and the matching may be realized in another method, such as matching the image and the LIDAR data, which are detected by using the artificial neural network.

Referring back to FIG. 35, the view will be described.

In step S2020, the device may calculate a sea level height by using the matched camera image and LIDAR data.

According to the embodiment, the device may calculate the sea level height by using LIDAR points selected by using the image matched with the LIDAR data among a plurality of LIDAR points of the LIDAR data. For example, the device may calculate a sea level height by using LIDAR points matched to an area corresponding to the sea in an image. As another example, the device may calculate a sea level height by using LIDAR points matched to an area corresponding to a vessel in an image.

According to the embodiment, the device may calculate a sea level height by using LIDAR points related to LIDAR beams reflected from the sea.

Figure 37:
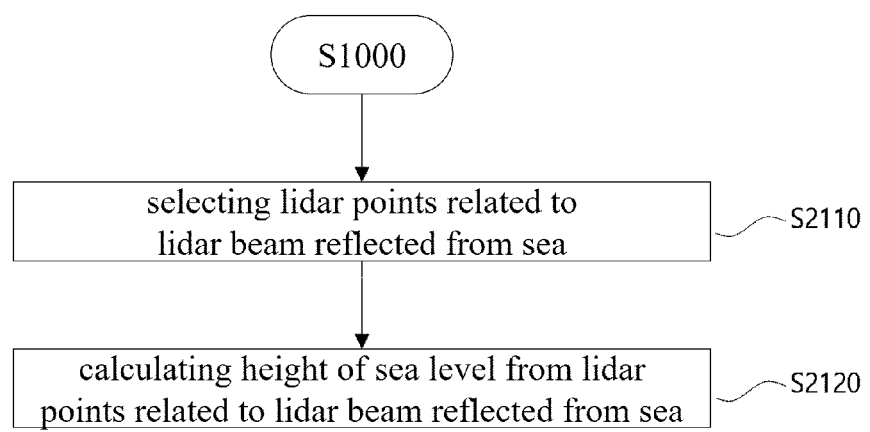

FIG. 37 is a flowchart illustrating a method for calculating a sea level height by using LIDAR points related to LIDAR beams reflected from the sea according to the embodiment. Referring to FIG. 37, the method for calculating the sea level height by using the LIDAR points related to the LIDAR beams reflected from the sea according to the embodiment may include: step of S2110 of selecting the LIDAR points related to the LIDAR beams reflected from the sea; and step of S2120 of calculating the sea level height from the LIDAR points related to the LIDAR beams reflected from the sea.

In step S2110, the device may select the LIDAR points related to the LIDAR beams reflected from the sea.

According to the embodiment, the device may select the LIDAR points related to the LIDAR beams reflected from the sea by using the image matched with the LIDAR data.

To this end, the device may detect an area corresponding to the sea in an image. For example, the device may detect the area corresponding to the sea in the image by using an artificial neural network. As an example, the device may generate a segmentation image from the image by using the artificial neural network, and detect, as the area corresponding to the sea, an area in which pixels labeled with object information indicating an object type are positioned. The device is not limited to the above description, and the area corresponding to the sea in the image may be detected in another method, such as determining an area corresponding to the sea through image detection.

The device may select the LIDAR points related to the LIDAR beams reflected from the sea by using the area corresponding to the sea in the detected image. For example, the device may select the LIDAR points related to the LIDAR beams reflected from the sea in consideration of pixel positions of pixels included in the area corresponding to the sea in the image.

Figure 38:
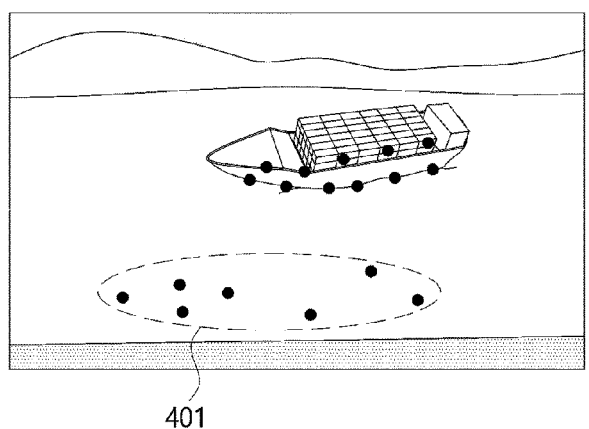

FIG. 38 is a view illustrating an example of the LIDAR points related to the LIDAR beams reflected from the sea according to the embodiment. Referring to FIG. 38, the device may select LIDAR points 401 related to LIDAR beams reflected from the sea among LIDAR points matched with an image. For example, the device may select the LIDAR points matched to the pixels included in the area corresponding to the sea in the image as the LIDAR points 401 related to the LIDAR beams reflected from the sea among the plurality of LIDAR points. Although not limited to FIG. 38, the LIDAR points 401 related to the LIDAR beams reflected from the sea may be selected in any other method in which a segmentation image or a detected image is used.

Selecting the LIDAR points 401 related to the LIDAR beams reflected from the sea is not limited to the above description, and the selection of the LIDAR points 401 may be realized in another method. According to the embodiment, the device may use the LIDAR data to select the LIDAR points related to the LIDAR beams 401 reflected from the sea. For example, the device may select the LIDAR points 401 related to the LIDAR beams reflected from the sea in consideration of distribution, the number of pieces of LIDAR data, and the like.

Referring back to FIG. 37 again, the view will be described.

In step S2120, the device may calculate the sea level height from the LIDAR points related to the LIDAR beams reflected from the sea.

The device may calculate a sea level height by using three-dimensional coordinate values of the LIDAR points related to the LIDAR beams reflected from the sea. According to the embodiment, the device may calculate the sea level height by using height values (e.g., Z values among the three-dimensional coordinate values) of the LIDAR points related to the LIDAR beams reflected from the sea. For example, the device may calculate an average value of the height values of the LIDAR points related to the LIDAR beams reflected from the sea, and generate the calculated average value of the height values as the sea level height.

According to the embodiment, the device may calculate a wave height of the sea level by using the three-dimensional coordinate values of the LIDAR points related to the LIDAR beams reflected from the sea.

For example, the device may calculate the wave height by using the height values (e.g., the Z values among the three-dimensional coordinate values) of the LIDAR points related to the LIDAR beams reflected from the sea. As an example, the device may calculate a maximum value and a minimum value of the height values of the LIDAR points related to the LIDAR beams reflected from the sea, and calculate a difference between the maximum value and the minimum value as the wave height.

Naturally, the device is not limited to the above description, and the sea level height may be calculated in another method, such as calculating a sea level height by reflecting the height values of the LIDAR points related to the LIDAR beams reflected from the sea at a preset ratio. Here, the preset ratio may be determined in consideration of the position, the number, and the like of each LIDAR point.

Figure 39:
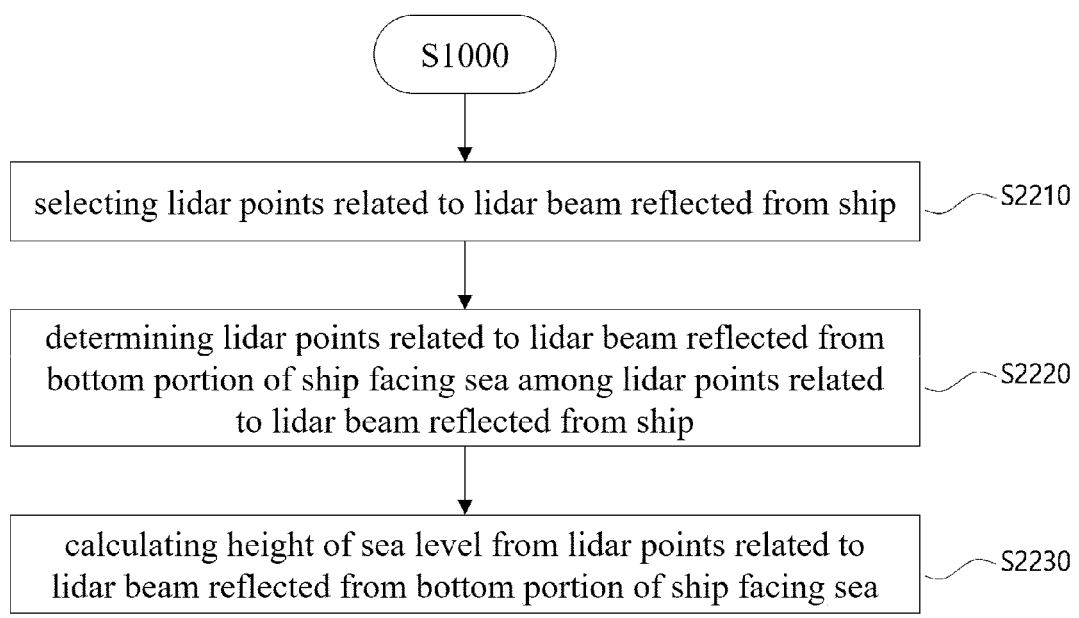

FIG. 39 is a flowchart illustrating a method for calculating a sea level height by using LIDAR points related to LIDAR beams reflected from a vessel according to the embodiment. Referring to FIG. 39, the method for calculating the sea level height by using the LIDAR points related to the LIDAR beams reflected from the vessel according to the embodiment may include: step of S2210 of selecting the LIDAR points related to the LIDAR beams reflected from the vessel; and step of S2220 of determining LIDAR points related to the LIDAR beams reflected from a lower area of the vessel in contact with the sea among the LIDAR points related to the LIDAR beams reflected from the vessel; and step of S2230 of calculating the sea level height from the LIDAR points related to the LIDAR beams reflected from the lower area of the vessel in contact with the sea.

In step S2210, the device may select the LIDAR points related to the LIDAR beams reflected from the vessel.

According to the embodiment, the device may select the LIDAR points related to LIDAR beams reflected from the vessel by using an image matched with LIDAR data.

To this end, the device may detect an area corresponding to a vessel in an image. For example, the device may detect the area corresponding to the vessel in the image by using an artificial neural network. As an example, the device may generate a segmentation image from the image by using the artificial neural network, and detect an area in which pixels labeled with object information in which an object type represents the vessel are positioned as the area corresponding to the vessel. The device is not limited to the above description, and the area corresponding to the vessel in the image may be detected in another method, such as determining an area corresponding to a vessel through image detection.

The device may select the LIDAR points related to the LIDAR beams reflected from the vessel by using the area corresponding to the vessel in a detected image. For example, the device may select the LIDAR points related to the LIDAR beams reflected from the vessel in consideration of pixel positions of pixels included in the area corresponding to the vessel in the image.

Figure 40:
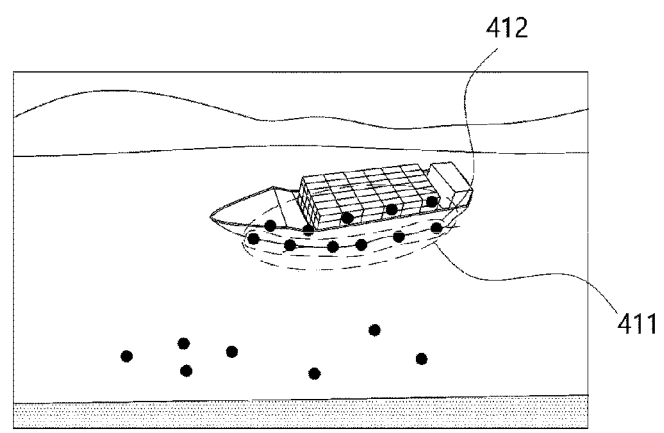

FIG. 40 is a view illustrating an example of the LIDAR points related to the LIDAR beams reflected from the vessel according to the embodiment. Referring to FIG. 40, the device may select LIDAR points 411 related to LIDAR beams reflected from a vessel from among LIDAR points matched with an image. For example, the device may select LIDAR points matched to the pixels included in the area corresponding to the vessel in the image as the LIDAR points 411 related to the LIDAR beams reflected from the vessel among the plurality of LIDAR points. Although not limited to FIG. 40, the LIDAR points 411 related to the LIDAR beams reflected from the vessel may be selected in another method in which a segmentation image or a detected image is used.

The selecting of the LIDAR points 411 related to the LIDAR beams reflected from the vessel is not limited to the above description, and may be realized in another method. According to the embodiment, the device may select the LIDAR points 411 related to the LIDAR beams reflected from the vessel by using the LIDAR data. For example, the device may select the LIDAR points 411 related to the LIDAR beams reflected from the vessel in consideration of distribution, the number of pieces of the LIDAR data, and the like.

In step S2220, the device may determine LIDAR points related to LIDAR beams reflected from a lower area of a vessel in contact with the sea among the LIDAR points related to the LIDAR beams reflected from the vessel.

Referring to FIG. 40, the device may determine LIDAR points 412 relates to the LIDAR beams reflected from the lower area of the vessel in contact with the sea by using the three-dimensional coordinate values of the LIDAR points 411 related to the LIDAR beams reflected from the vessel. According to the embodiment, the device may determine the LIDAR points 412 related to the LIDAR beams reflected from the lower area of the vessel in contact with the sea on the basis of height values (e.g., the Z values among the three-dimensional coordinate values) of the LIDAR points 411 related to the LIDAR beams reflected from the vessel. For example, the device may generate LIDAR lines including LIDAR points having substantially the same height values, and determine the LIDAR lines including the LIDAR points having the lowest height values among the generated LIDAR lines as the LIDAR points related to the LIDAR beams reflected from the lower area of the vessel in contact with the sea. Here, the LIDAR lines may have the number or lengths of LIDAR points within a preset range.

For another example, the device may include a LIDAR sensor having a plurality of channels having different vertical angles, and determine LIDAR points including LIDAR points, each having the lowest height value for each channel, as the LIDAR points 412 related to the LIDAR beams reflected from the lower area of the vessel in contact with the sea.

The determination of the LIDAR points 412 related to the LIDAR beams reflected from the lower area of the vessel in contact with the sea is not limited to the above description, and may be realized in another method, such as determining the LIDAR points 412 by LIDAR points having height values of the preset range other than the LIDAR points having the lowest height values.

Referring back to FIG. 39, the view will be described.

In step S2230, the device may calculate a sea level height from the LIDAR points related to the LIDAR beams reflected from the lower area of the vessel in contact with the sea.

The device may calculate the sea level height by using the three-dimensional coordinates of the LIDAR points related to the LIDAR beams reflected from the lower area of the vessel in contact with the sea. According to the embodiment, the device may calculate the sea level height by using height values (e.g., the Z values among three-dimensional coordinate values) of the LIDAR points related to the LIDAR beams reflected from the lower area of the vessel in contact with the sea. For example, the device may calculate, as the sea level height, the height values of the LIDAR points related to the LIDAR beams reflected from the lower area of the vessel in contact with the sea.

According to the embodiment, the device may calculate wave heights at sea level by using the three-dimensional coordinate values of the LIDAR points related to the LIDAR beams reflected from the lower area of the vessel.

For example, the device may calculate the wave heights by using the height values (e.g., the Z values among the three-dimensional coordinate values) of the LIDAR points related to the LIDAR beams reflected from the lower area of the vessel. As an example, the device may estimate the LIDAR points related to the LIDAR beams reflected from the lower area of the vessel as a Gaussian distribution, and calculate a range of height values from the estimated distribution as the wave heights.

According to the embodiment, the device may verify the calculated sea level height. For example, the device may confirm the validity of the sea level height calculated from the LIDAR points related to the LIDAR beams reflected from the vessel in consideration of the characteristics (e.g., the number of LIDAR points, deviation of height values, distance values, etc.) of the LIDAR points related to the LIDAR beams reflected from the vessel. As an example, the device may determine that the validity of the sea level height calculated from the LIDAR points related to the LIDAR beams reflected from the vessel is low when the number of LIDAR points related to the LIDAR beams reflected from the vessel is too small, or the deviation of height values is too large, or the distance values are too short or long.

Naturally, the device is not limited to the above description, and the sea level height may be calculated in another method, such as calculating the sea level height by adjusting, by preset conditions, the height values of the LIDAR points related to the LIDAR beams reflected from the lower area of the vessel in contact with the sea.

The accuracy of the sea level height calculated from the LIDAR points may vary depending on situations. For example, the device is generally easy to obtain LIDAR data from rippling seas, but there is a possibility that LIDAR data obtained from the sea in a case of having very fine weather and very calm seas has a very small volume and has a noise. That is, the accuracy of the sea level height calculated from the LIDAR points related to the LIDAR beams reflected from the sea may be lower.

As another example, the device is generally easy to obtain LIDAR data from a vessel at a reasonable distance from a LIDAR sensor, but there is a possibility that a lower area of the vessel in contact with the sea may be occluded by a berth when the LIDAR sensor and the vessel are too close, whereas LIDAR data having a large distance measurement error may be obtained when the LIDAR sensor and the vessel are too far away. That is, the accuracy of the sea level height calculated from the LIDAR points related to the LIDAR beams reflected from the vessel may be lower.

Accordingly, the device may perform a sea level height calculation method to increase the accuracy of the calculated sea level height in various situations.

According to the embodiment, the device may calculate a sea level height by using an estimated sea level height.

Figure 41:
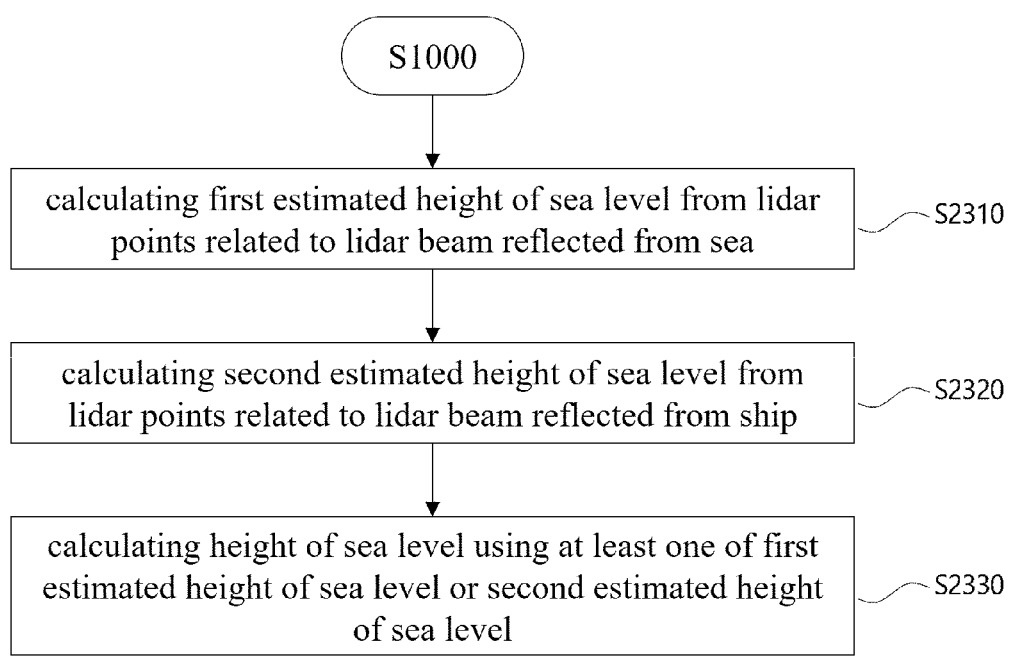

FIG. 41 is a flowchart illustrating a method for calculating a sea level height by using an estimated sea level height according to the embodiment. Referring to FIG. 41, the method of calculating the sea level height by using the estimated sea level height according to the embodiment may include: step S2310 of calculating a first estimated sea level height from LIDAR points related to LIDAR beams reflected from the sea; step S2320 of calculating a second estimated sea level height from LIDAR points related to LIDAR beams reflected from a vessel; and step S2330 of calculating the sea level height by using at least one of the first estimated sea level height and the second estimated sea level height.

In step S2310, the device may calculate the first estimated sea level height from the LIDAR points related to the LIDAR beams reflected from the sea. The device may calculate a sea level height calculated from the LIDAR points related to the LIDAR beams reflected from the sea as the first estimated sea level height. In this step, since the above-described content may be applied as it is, a more detailed description will be omitted.

In step S2320, the device may calculate the second estimated sea level height from the LIDAR points related to the LIDAR beams reflected from the vessel. The device may calculate the sea level height calculated from the LIDAR points related to the LIDAR beams reflected from the vessel as the second estimated sea level height. In this step, since the above-described content may be applied as it is, a more detailed description will be omitted.

In step S2330, the device may calculate the sea level height by using at least one of the first estimated sea level height and the second estimated sea level height.

According to the embodiment, the device may calculate a sea level height on the basis of a weighted sum of the first estimated sea level height and the second estimated sea level height. For example, the device may calculate the sea level height by the weighted sum of a first estimated sea level height to which a first weight is assigned and a second estimated sea level height to which a second weight is assigned.

According to the embodiment, the device may determine a weight assigned to an estimated sea level height on the basis of a distance from a berth.

For example, in assigning a weight to the first estimated sea level height that is estimated from the LIDAR points related to the LIDAR beams reflected from the sea, the device may give a higher weight as a distance between the lidar points and a berth is closer. This is because the accuracy of the LIDAR points related to the LIDAR beams reflected from the sea close to the berth is higher than that of the LIDAR points related to the LIDAR beams reflected from the sea far from the berth.

For example, in assigning a weight to a second estimated sea level height that is estimated from the LIDAR points related to the LIDAR beams reflected from the vessel, the device may give a higher weight as a distance between the lidar points and the berth is farther. Here, the device may give a lower weight as a distance from the berth increases at more than a specific distance while giving a higher weight as the distance from the berth increases up to the specific distance, and then. This is because there is a possibility that the lower area of the vessel in contact with the sea may be occluded by a berth when a LIDAR sensor and the vessel are too close, so there may occur noise, and there is a possibility that LIDAR data having a large distance measurement error may be obtained when the LIDAR sensor and the vessel are too far away.

Naturally, the device is not limited to the above description, and the weight may be assigned in another method, such as giving a high weight to a sea level height estimated from LIDAR points within a specific distance range.

According to the embodiment, the device may determine a weight assigned to the estimated sea level height on the basis of the calculated wave heights. For example, the device may determine the weight assigned to the estimated sea level height on the basis of changes in wave heights per unit time. This is because, in general, the changes in the wave heights per unit time is small.

For example, in assigning a weight to the first estimated sea level height that is estimated from the LIDAR points related to the LIDAR beams reflected from the sea, the device may give a higher weight as values of the wave heights calculated from the LIDAR points related to the LIDAR beams reflected from the sea is less changed over time.

For another example, in assigning a weight to the second estimated sea level height that is estimated from the LIDAR points related to the LIDAR beams reflected from the vessel, the device may give a higher weight as values of the wave heights calculated from the LIDAR points related to the LIDAR beams reflected from the vessel is less changed over time.

Naturally, the device is not limited to the above description, and a weight may be assigned in another method, such as adding a weight by combining the above-described methods.

According to the embodiment, the device may calculate a sea level height by using confidence of LIDAR points.

Figure 42:
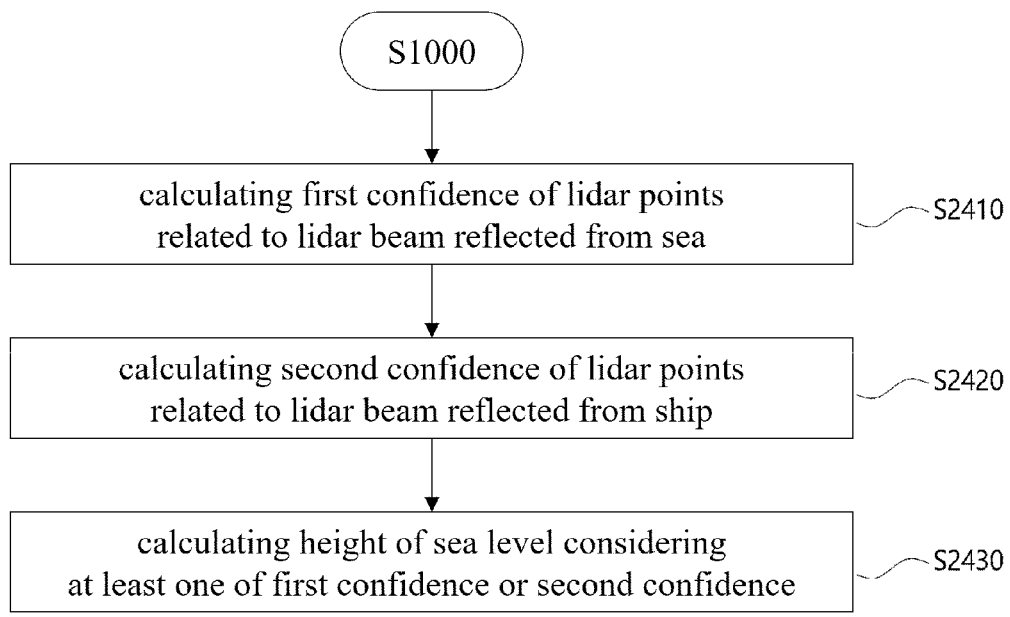

FIG. 42 is a flowchart illustrating a method of calculating a sea level height by using confidence of LIDAR points according to the embodiment. Referring to FIG. 42, the method for calculating the sea level height by using the confidence of the LIDAR points according to the embodiment may include: step S2410 of calculating first confidence of LIDAR points related to LIDAR beams reflected from the sea; step S2420 of calculating second confidence of LIDAR points related to LIDAR beams reflected from a vessel; and step S2430 of calculating the sea level height in consideration of at least one of the first confidence and the second confidence. Confidence may refer to accuracy of whether LIDAR points related to LIDAR beams reflected from a specific object is actually generated by being reflected from the specific object.

In step S2410, the device may calculate the first confidence of the LIDAR points related to the LIDAR beams reflected from the sea. For example, the device may use LIDAR data to calculate the first confidence of the LIDAR points related to the LIDAR beams reflected from the sea.

According to the embodiment, the device may calculate the first confidence of the LIDAR points related to the LIDAR beams reflected from the sea on the basis of characteristics of the LIDAR points. The characteristics of the LIDAR points may include, for example, the number of LIDAR points, deviation of height values, distance values, coordinates, and the like. For example, the device may calculate the first confidence as low when the number of LIDAR points related to the LIDAR beams reflected from the sea is too small. As another example, the device may calculate the first confidence as low when the deviation of the height values of the LIDAR points related to the LIDAR beams reflected from the sea is too large. As yet another example, the device may calculate the first confidence as low when the deviation of distance values of the LIDAR points related to the LIDAR beams reflected from the sea is too large. The device is not limited to the above description, and the first confidence may be calculated in another method, such as calculating first confidence of the LIDAR points related to the LIDAR beams reflected from the sea by using a camera image.

In step S2420, the device may calculate second confidence of the LIDAR points related to the LIDAR beams reflected from the vessel. For example, the device may use the LIDAR data to calculate the second confidence of the LIDAR points related to the LIDAR beams reflected from the vessel.

According to the embodiment, the device may calculate the second confidence of the LIDAR points related to the LIDAR beams reflected from the vessel on the basis of the characteristics of the LIDAR points. The characteristics of the LIDAR points may include, for example, the number of LIDAR points, deviation of height values, distance values, coordinates, and the like. For example, the device may calculate the second confidence as low when the number of LIDAR points related to the LIDAR beams reflected from the vessel is too small. As another example, the device may calculate the second confidence as low when the deviation of the height values of the LIDAR points related to the LIDAR beams reflected from the vessel is too large. As yet another example, the device may calculate the second confidence as low when the deviation of distance values of the LIDAR points related to the LIDAR beams reflected from the vessel is too large.

According to the embodiment, the device may use a camera image to calculate second confidence of the LIDAR points related to LIDAR beams reflected from a vessel. For example, the device may calculate the second confidence of the LIDAR points related to the LIDAR beams reflected from the vessel by using vessel information obtained from the camera image. The vessel information means information about the vessel, and may include, for example, whether the vessel in the image is detected, information (e.g., a size, a shape, etc.) about an area corresponding to the vessel in the image, a distance to the vessel obtained from the image, speed of the vessel obtained from the image, occlusion related to the vessel, and the like.

As an example, the device may calculate the second confidence of the LIDAR points related to LIDAR beams reflected from the vessel as high when the vessel is detected in the image. As another example, when the size of an area corresponding to the vessel in the image falls within a specific size range, the device may calculate the second confidence of the LIDAR points related to the LIDAR beams reflected from the vessel as high. As yet another example, when the distance to the vessel obtained from the image falls within a specific distance range, the device may calculate the second confidence of the LIDAR points related to the LIDAR beams reflected from the vessel as high. As still another example, when there is no occlusion related to the vessel obtained from the image, the device may calculate the second confidence of the LIDAR points related to the LIDAR beams reflected from the vessel as high.

The device is not limited to the above description, and the second confidence may be calculated in another method, such as calculating second confidence by combining the above-described methods.

In step S2430, the device may calculate the sea level height in consideration of at least one of the first confidence and the second confidence.

According to the embodiment, the device may calculate the sea level height by comparing the first confidence and the second confidence with each other. For example, the device may calculate the sea level height from the LIDAR points related to the LIDAR beams reflected from the vessel when the first confidence is less than the second confidence. As another example, the device may calculate the sea level height from the LIDAR points related to the LIDAR beams reflected from the sea when the first confidence is greater than the second confidence.

According to the embodiment, the device may calculate the sea level height by comparing threshold confidence with at least one of the first confidence and the second confidence. For example, when the first confidence is greater than or equal to the threshold confidence, the device may calculate a sea level height from the LIDAR points related to the LIDAR beams reflected from the sea. For another example, when the second confidence is greater than or equal to the threshold confidence, the device may calculate a sea level height from the LIDAR points related to the LIDAR beams reflected from the vessel.

The device is not limited to the above description, and may calculate the sea level height in another method, such as reflecting a ratio of the first confidence and the second confidence to the sea level height calculated from the LIDAR points related to the LIDAR beams reflected from both of the sea and the vessel.

According to the embodiment, the device may calculate a sea level height by using a result of analyzing a camera image. For example, the device may recognize a situation through the camera image, and calculate the sea level height by using LIDAR data suitable for the recognized situation.

Figure 43:
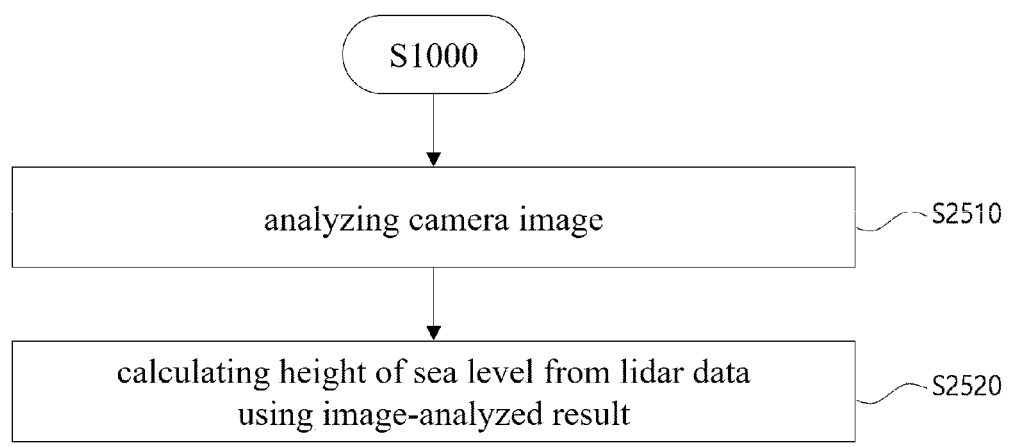

FIG. 43 is a flowchart illustrating the method for calculating a sea level height by using a result of analyzing a camera image according to the embodiment. Referring to FIG. 43, the method for calculating the sea level height by using the result of analyzing the camera image according to the embodiment may include: step S2510 of analyzing a camera image; and step S2520 of calculating a sea level height from LIDAR data by using the image analysis result.

In step S2510, the device may analyze the camera image. For example, the device may analyze the camera image and determine the presence of a vessel.

According to the embodiment, the device may obtain vessel information related to a vessel from a camera image. The vessel information means information about the vessel, and may include, for example, whether the vessel in the image is detected, information (e.g., a size, a shape, etc.) about an area corresponding to the vessel in the image, a distance to the vessel obtained from the image, speed of the vessel obtained from the image, occlusion related to the vessel, and the like. For example, the device may use an artificial neural network to obtain the vessel information in the image. As an example, the device may generate a segmentation image from the image by using the artificial neural network, and detect an area in which pixels labeled with object information indicating an object type of the vessel are positioned as an area corresponding to the vessel, thereby obtaining the vessel information. The vessel information may include whether the vessel is detected, information (e.g., a size, a shape, etc.) about an area corresponding to the vessel in the image, a distance to the vessel obtained from the image, speed of the vessel obtained from the image, occlusion related to the vessel, and the like. Since the above-described content may be applied to the obtaining of the vessel information as it is, more detailed content will be omitted.

The device is not limited to the above description, and may obtain vessel information from an image in another method, such as determining an area corresponding to a vessel through image detection.

In step S2520, the device may calculate a sea level height from LIDAR data by using an image analysis result. For example, the device may calculate the sea level height from LIDAR points different depending on the presence or absence of a vessel. As an example, the device may calculate the sea level height from the LIDAR points related to the LIDAR beams reflected from the vessel when there is the vessel according to the image analysis result, and calculate the sea level height from the LIDAR points related to the LIDAR beams reflected from the sea when there is no vessel according to the image analysis result.

According to the embodiment, the device may calculate a sea level height from LIDAR data by using the vessel information obtained from a camera image. For example, the device may calculate the sea level height from specific LIDAR points on the basis of the vessel information obtained from the camera image.

According to the embodiment, the device may calculate the sea level height from the LIDAR data on the basis of whether preset conditions are satisfied by the vessel information obtained from the camera image. For example, the device may calculate the sea level height from the specific LIDAR points according to whether the preset conditions are satisfied.

As an example, the device may calculate a sea level height from the LIDAR points related to the LIDAR beams reflected from the vessel when the preset conditions are satisfied by the vessel information. Here, the preset conditions may include a condition in which the vessel is detected, a condition in which the size of an area corresponding to the vessel belongs to a specific range, a condition in which a distance to the vessel belongs to a specific range, a condition in which occlusion related to the vessel is not detected, etc. That is, when the vessel is detected from a camera image, or when the detected vessel meets the specific conditions that guarantees a predetermined level of accuracy, the device may calculate the sea level height from the LIDAR points related to the LIDAR beams reflected from the vessel.

As another example, when the conditions preset by the vessel information are not satisfied, the device may calculate a sea level height from the LIDAR points related to the LIDAR beams reflected from the sea. Here, the preset conditions may include a condition in which a vessel is not detected, a condition in which the size of an area corresponding to the vessel does not belong to a specific range, a condition in which the distance to the vessel does not belong to a specific range, the condition in which occlusion related to the vessel is detected, etc. That is, when the vessel is not detected from a camera image, or when the detected vessel does not meet the specific conditions that guarantee the predetermined level of accuracy, the device may calculate the sea level height from the LIDAR points related to the LIDAR beams reflected from the sea.

In addition, the device may calculate a sea level height from LIDAR data in consideration of vessel information obtained from a subsequent image. For example, the device may calculate the sea level height from the LIDAR points related to the LIDAR beams reflected from the vessel when the preset conditions are satisfied, and maintain the calculated sea level height as a sea level height when the preset conditions are not satisfied by the vessel information obtained from the subsequent image. For another example, the device may calculate the sea level height from the LIDAR point related to the LIDAR beams reflected from the vessel when the preset conditions are satisfied, and may update the calculated sea level height in consideration of the sea level height calculated from subsequent LIDAR data when the preset conditions are also satisfied by the vessel information obtained from the subsequent image. Here, the subsequent image and the subsequent LIDAR data may correspond to each other, for example, corresponding to each other by being obtained at the same time point.

The method of calculating the sea level height from the LIDAR data by using the image analysis result is not limited to the above description, and may be implemented in another method, such as adding a shape of a detected vessel to the preset conditions.

In the above, the method of calculating the sea level information on the basis of two different types of images has been described, but the sea level information may be calculated on the basis of three or more types of images.

The monitoring device may receive sea level information from outside. The monitoring device may receive the sea level information from an external device having the sea level information.

The external device having the sea level information may be a sensor capable of measuring a sea level height. In this case, the monitoring device may receive the sea level information from a separate sensor capable of measuring the sea level height. For example, the sea level information may be calculated by measuring a water depth at a predetermined location with a sensor, capable of measuring the water depth, such as an ultrasonic detector. (For example, it may be seen that the sea level height has increased when the water depth has increased.)

The external device having sea level information may be a vessel traffic service system (VTS system). In this case, the monitoring device may receive the sea level information from the vessel traffic service system.

Sea level information may be calculated by considering the tide. In a specific area, a sea level height may change between a high tide and an ebb tide, and may be predicted over time, so the sea level information may also be calculated. For example, when at least one of an area and a time is input, a function for outputting sea level information may be set.

The monitoring method may include steps other than the above-described steps.

The monitoring method may include a pre-processing step. The pre-processing refers to all kinds of processing performed on an image, and may include image normalization, image equalization or histogram equalization, image resizing, upscaling and downscaling to change a resolution/size of the image, cropping, noise removal, and the like. Here, noise may include fog, rains, water droplets, sea clutter, fine dust, direct sunlight, salt, and combinations thereof. Removing the noise may include removing or reducing noise components included in the image.

Describing normalization as an example of the pre-processing, the normalization may mean obtaining an average of RGB values of all pixels of an RGB image and subtracting the average from the RGB image.

Describing defogging as another example of the pre-processing, the defogging may mean transforming a photographed image of a foggy area to look like a photographed image of a sunny area through the pre-processing. FIG. 44 is a diagram related to fog removal according to the embodiment. Referring to FIG. 44, the photographed image of the foggy area as shown at the top of FIG. 44 may be transformed into an image in which fog is removed as shown at the bottom of FIG. 44 through the fog removal.

Describing water drop removal as yet another example of the pre-processing, the water drop removal may mean transforming water droplets on the front of a camera so that the water droplets appear to have been removed through the pre-processing in a photographed image.

The pre-processing step may be performed after the image obtaining step. For example, the monitoring method may sequentially include the image obtaining step, the pre-processing step, and the segmentation image generation step, or sequentially include the image obtaining step, the pre-processing step, and the viewpoint transformation step, but is not limited thereto. Through the image pre-processing, berthing guide information may be easily obtained or the accuracy of the berthing guide information may be improved.

The pre-processing step may be performed through an artificial neural network. For example, an image from which noise has been removed may be obtained by inputting the image including the noise into the artificial neural network, so that a photographed image captured in a foggy area is input into the artificial neural network, whereby the foggy area image may be transformed into an image that looks like a photographed image captured in a sunny area. Examples of the artificial neural network include a GAN, etc., but are not limited thereto, Alternatively, the pre-processing step may be performed by using an image mask. For example, by applying the image mask to the photographed image captured in the foggy area, the foggy area image may be transformed into the image that looks like the photographed image captured in the sunny area. Here, examples of the image mask include a deconvolution filter, a sharpen filter, and the like. The image mask may also be generated through the artificial neural network such as the GAN, but the method is not limited thereto.

Figure 45:
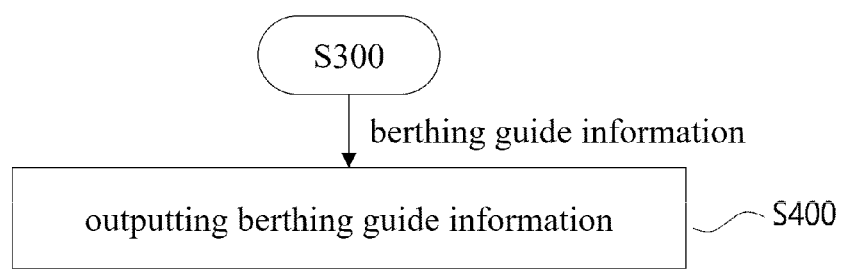
FIG. 45 is a diagram illustrating a step of outputting the berthing guide information according to the embodiment.

The monitoring method may include outputting berthing guide information. FIG. 45 is a diagram illustrating a step of outputting the berthing guide information according to the embodiment. Referring to FIG. 45, the monitoring method may include step S400 of outputting berthing guide information calculated through step S300 of obtaining the berthing guide information.

The berthing guide information may be output visually. For example, the berthing guide information may be output through an output module such as a display.

The outputting of the berthing guide information may include displaying an image obtained by using the image generation unit in the image obtaining step. In addition, the outputting of the berthing guide information may include displaying various monitoring-related images, such as an image that has undergone the pre-processing step, an image after segmentation, and an image after viewpoint transformation.

Figure 46:
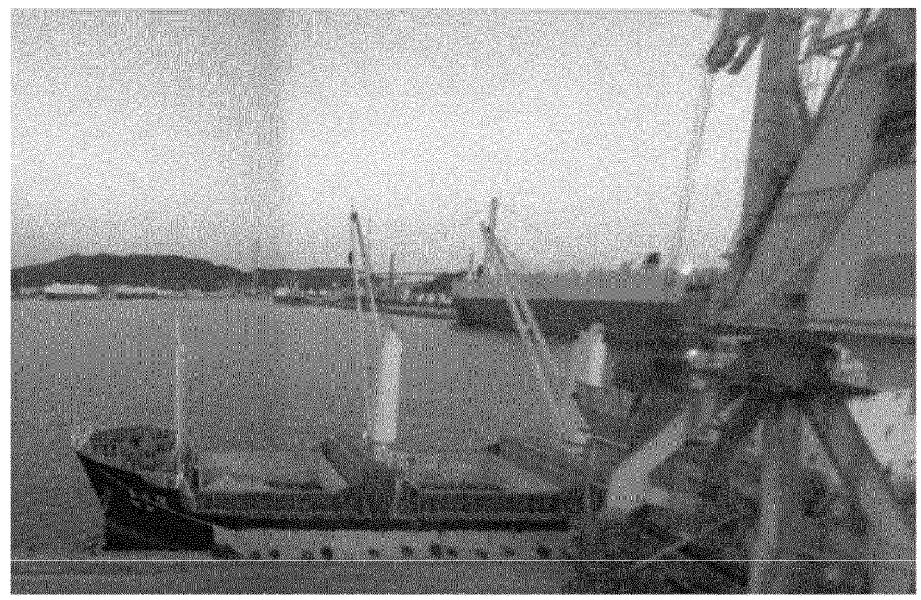
FIG. 46 is a diagram related to the step of outputting the berthing guide information according to the embodiment.

FIG. 46 is a view related to the outputting of the berthing guide information according to the embodiment. Referring to FIG. 46, an image and distance/speed information may be displayed together. As shown in FIG. 46, the displayed distance/speed information may include distances and speed between the respective bow and stern of a target vessel and a wharf wall, and distances between the target vessel and other respective vessels.

The outputting of the berthing guide information may include providing information to a user in another method, such as outputting a sound or vibration in addition to a visual display. For example, a warning sound may be output when a target vessel is in danger of colliding with a wharf wall, another vessel, an obstacle, etc., or when the speed of approaching to the wharf wall is higher than a reference speed when berthing, or when the target vessel deviates from a route.

In the above, the monitoring method based on a single image has been mainly described, but monitoring may be performed on the basis of a plurality of images. When the monitoring is performed on the basis of the plurality of images, a total monitoring area of the monitoring device may increase or the accuracy of monitoring may be improved.

The monitoring method based on the plurality of images may include matching the plurality of images. For example, one matched image may be generated by matching a first image and a second image, and berthing guide information may be obtained on the basis of the matched images.

The image matching step may be performed before or after the segmentation image generation step. For example, after generating the matched images by matching a plurality of harbor images, image segmentation may be performed, or after performing segmentation on each of the plurality of harbor images, the plurality of segmentation images may be matched.

The image matching step may be performed before or after the viewpoint transformation step. For example, viewpoint transformation may be performed after generating the matched images by matching the plurality of harbor images, or the viewpoint transformation may be performed on each of the plurality of harbor images and then the plurality of viewpoint transformation images may be matched.

The sea level information may be taken into account before or after the matching of the plurality of images, or both before and after the matching. For example, the plurality of images may be corrected in consideration of the sea level information and then matched with each other, or the matched images may be generated by matching the plurality of images, and then the matched images may be corrected in consideration of the sea level information.

The image matching may be performed through feature point matching. For example, a matching image may be generated by extracting feature points of the first image and the second image and then matching the extracted feature points. In this case, the matching information may include feature points and information necessary for feature point matching.

A homography matrix may be required for the image matching. In this case, the matching information may include the homography matrix. The term homography refers to matching between any two images on the same plane, and the homography matrix may be expressed as Equation 2.

$$w\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix} \quad \text{Equation 2}$$

Here, 3×1 matrices on the left side and the right side indicate coordinates of an image, and a 3×3 matrix on the right side indicates the homography matrix. A homography matrix between a plurality of images may be computed, and then image matching may be performed using the homography matrix to generate a matching image.

The above-described image matching method is for illustrative purposes only, and image matching may be performed by other methods.

In the above, the monitoring has been mainly described when a vessel is berthed, but the monitoring may also be applied to a case where the vessel is unberthed or when the vessel is operating. For example, the method described above may be applied to assist or guide a safe operation of a vessel, such as detecting other vessels or obstacles around the vessel, or warning collisions or recommending/creating a route by using distances to the vessels or obstacles, moving speed of the vessels or obstacles, and the like. Alternatively, autonomous navigation may be performed on the basis of such information. In addition, although it has been described that guide information is obtained in consideration of the sea level, it is not limited to the sea level and should be broadly understood as considering water surfaces. The above-described berthing guide information may be referred to as unberthing guide information when a vessel is unberthed, and navigation guide information when the vessel is operating. The obtaining of the unberthing guide information/the obtaining of the navigation guide information may include the above-described step of obtaining the berthing guide information.

Figure 47:
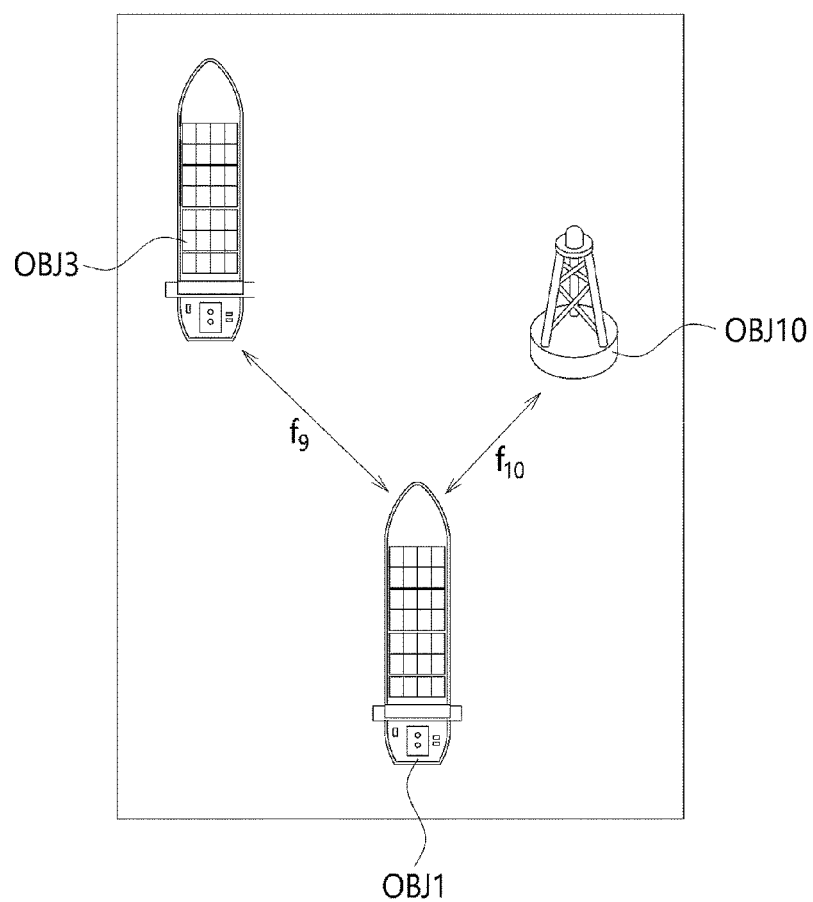
FIG. 47 is a diagram illustrating navigation guide information according to the embodiment.

FIG. 47 is a diagram illustrating the navigation guide information according to the embodiment. Referring to FIG. 47, the obtaining of the navigation guide information may include calculating navigation guide information f9 and f10 with another vessel OBJ3 or an obstacle OBJ10 such as a buoy when a target vessel OBJ1 operates.

When the monitoring device is installed on a vessel, an installation height may change according to the operation of the vessel. When the monitoring device is installed in a place whose height does not change, such as in a harbor, the height of the device will be constant unless it is intentionally changed, so when only the sea level height is known, a distance from the sea level to the device may be predicted. However, when the monitoring device is installed in a place whose height changes, such as the vessel, even when the sea level height is known, an exact distance from the sea level to the device may not be predicted unless the draft of the vessel is known. For example, when the monitoring device is installed in the harbor, it may be seen that a distance between the monitoring device and the sea level decreases when the sea level height increases, but when installed on the vessel, the draft of the vessel may decrease even though the sea level height increases, whereby the distance between the device and the sea level may increase. Therefore, in this case, it is necessary to obtain a relative distance between the device and the sea level rather than the sea level height, and in order to obtain the guide information from the monitoring device installed on the vessel, the sea level information needs to be determined by reflecting the draft of the vessel. This point of view may also be applied to the case of obtaining the berthing guide information.

The method according to an embodiment may be implemented in the form of program instructions executable by a variety of computing means and may be recorded on a computer-readable medium. The computer-readable medium may include program instructions, data files, data structures, and the like alone or in combination. The program instructions recorded on the medium may be designed and configured specifically for an embodiment or may be publicly known and available to those skilled in the field of computer software. Examples of the computer-readable recording medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the computer instructions include not only machine language code generated by a compiler, but also high-level language code executable by a computer using an interpreter or the like. The hardware device may be configured to operate as one or more software modules in order to perform the operations of an embodiment, and vice versa.

While the elements and features of the present invention have been described with reference to embodiments, the present invention is not limited thereto. It will be obvious to those skilled in the art that various changes or modifications may be made therein without departing from the spirit and scope of the present invention. Accordingly, such changes or modifications are intended to fall within the scope of the appended claims.

What is claimed is:

1. A method for monitoring a harbor performed by a computing device, the method comprising:
    obtaining a preset first view transformation information used to transform an image having a first view attribute into an image having a second view attribute different from the first view attribute;
    obtaining a harbor image having the first view attribute;
    generating a segmentation image having the first view attribute and corresponding to the harbor image by performing an image segmentation using an artificial neural network trained to output information, from an input image, related to an object included in the input image, wherein the segmentation image includes a first pixel labeled to correspond to a ship and a second pixel labeled to correspond to a sea;
    obtaining sea level information reflecting a height of a sea level;
    updating the first view transformation information by reflecting the sea level information;
    generating a transformed segmentation image having the second view attribute through a viewpoint transformation of the segmentation image using the updated first view transformation information; and
    calculating berthing guide information of the ship based on the transformed segmentation image, wherein the berthing guide information includes at least one of information related to a distance to a wharf wall of the ship or information related to an approaching velocity of the ship to the wharf wall.

2. The method of claim 1, wherein updating the first view transformation information is updating the first view transformation information generated based on a reference plane by reflecting the sea level information.

3. The method of claim 1, wherein the berthing guide information is calculated based on a border area that is an area of the ship in contact with the sea level.

4. The method of claim 3,
    wherein the information related to the distance to the wharf wall of the ship corresponds to a distance to the wharf wall of the border area, and
    wherein the information related to the approaching velocity to the wharf wall corresponds to an approaching velocity of the border area to the wharf wall.

5. The method of claim 3, wherein the berthing guide information is calculated based on a first point corresponding to a bow of the ship and a second point corresponding to a stern of the ship, wherein the first point and the second point are included in the border area.

6. The method of claim 5,
    wherein the information related to the distance to the wharf wall of the ship corresponds to a distance to the wharf wall of the first point and the second point, and wherein the information related to the approaching velocity to the wharf wall corresponds to an approaching velocity of the first point and the second point to the wharf wall.

7. The method of claim 1, wherein the harbor image includes a first harbor image and a second harbor image in which a monitoring area overlaps at least partially with the first harbor image.

8. The method of claim 7, wherein obtaining the sea level information comprises calculating the sea level information based on an overlap area that is an area in which a monitoring area of the first harbor image and a monitoring area of the second harbor image overlap.

9. The method of claim 8, wherein obtaining the sea level information further comprises determining the overlap area based on feature points of the first harbor image and the second harbor image that match each other.

10. The method of claim 1, wherein obtaining the sea level information comprises calculating the sea level information based on a shaded area corresponding to a sea occluded by the wharf wall and not represented in the harbor image.

11. The method of claim 1, wherein obtaining the sea level information comprises calculating the sea level information based on an area where a height measurement object included in the harbor image is exposed above the sea level.

12. The method of claim 1, wherein obtaining the sea level information comprises receiving the sea level information from a sensor for measuring the sea level information.

13. The method of claim 1, wherein obtaining the sea level information comprises receiving the sea level information from a vessel traffic service system (VTS system).

14. The method of claim 1, wherein the berthing guide information further includes at least one of information related to a distance to an adjacent ship of the ship or information related to an approaching velocity of the ship to the adjacent ship.

15. The method of claim 1, further comprising generating a display image having a third view attribute through a viewpoint transformation of the harbor image using second view transformation information used to transform an image having the first view attribute into an image having the third view attribute different from the first view attribute and the second view attribute.

16. The method of claim 15, further comprising outputting the display image and the berthing guide information.

17. The method of claim 16, wherein the outputting comprises at least one of:
transmitting the display image and the berthing guide information to a terminal to display the display image and the berthing guide information using the terminal remotely located; or
displaying the display image and the berthing guide information.

18. The method of claim 1, wherein the second view is a view overlooking the sea level in a direction perpendicular to the sea level.

19. A method for monitoring a surrounding of a ship performed by a computing device, the method comprising:

obtaining a preset first view transformation information used to transform an image having a first view attribute into an image having a second view attribute different from the first view attribute;
obtaining a marine image having the first view attribute;
generating a segmentation image having the first view attribute and corresponding to the marine image by performing an image segmentation using an artificial neural network trained to output information, from an input image, related to an object included in the input image, wherein the segmentation image includes a first pixel labeled to correspond to an obstacle and a second pixel labeled to correspond to a sea;
obtaining sea level information reflecting a height of a sea level;
updating the first view transformation information by reflecting the sea level information;
generating a transformed segmentation image having the second view attribute through a viewpoint transformation of the segmentation image using the updated first view transformation information; and
calculating navigation guide information of the ship based on the transformed segmentation image, wherein the navigation guide information includes at least one of information related to a distance to the obstacle of the ship or information related to an approaching velocity of the ship to the obstacle.

20. A non-transitory computer-readable recording medium sorting instructions thereon, the instructions when executed by a processor cause the processor to:
obtain a preset first view transformation information used to transform an image having a first view attribute into an image having a second view attribute different from the first view attribute;
obtain a harbor image having the first view attribute;
generate a segmentation image having the first view attribute and corresponding to the harbor image by performing an image segmentation using an artificial neural network trained to output information, from an input image, related to an object included in the input image, wherein the segmentation image includes a first pixel labeled to correspond to a ship and a second pixel labeled to correspond to a sea;
obtain sea level information reflecting a height of a sea level;
update the first view transformation information by reflecting the sea level information;
generate a transformed segmentation image having the second view attribute through a viewpoint transformation of the segmentation image using the updated first view transformation information; and
calculate berthing guide information of the ship based on the transformed segmentation image, wherein the berthing guide information includes at least one of information related to a distance to a wharf wall of the ship or information related to an approaching velocity of the ship to the wharf wall.

* * * * *